US012753628B2

(12) United States Patent
Snowden et al.

(10) Patent No.: US 12,753,628 B2
(45) Date of Patent: Oct. 6, 2026

(54) TOOL-LESS RELEASE ANIMAL SAFETY BARRIERS

(71) Applicant: Solid Rock Enterprises, Lorena, TX (US)

(72) Inventors: Phyllis B. Snowden, Lorena, TX (US); Timothy D. Snowden, Lorena, TX (US); Benjamin P. Snowden, Lorena, TX (US); Luke N. Snowden, Lorena, TX (US); Anna E. Snowden, Lorena, TX (US); Lydia C. Snowden, Lorena, TX (US); Seth D. Snowden, Lorena, TX (US)

(73) Assignee: SOLID ROCK ENTERPRISES, Lorena, TX (US)

( * ) Notice: Subject to any disclaimer, the term of this patent is extended or adjusted under 35 U.S.C. 154(b) by 155 days.

(21) Appl. No.: 18/683,771

(22) PCT Filed: Aug. 25, 2022

(86) PCT No.: PCT/US2022/075430
§ 371 (c)(1),
(2) Date: Feb. 15, 2024

(87) PCT Pub. No.: WO2023/028541
PCT Pub. Date: Mar. 2, 2023

(65) Prior Publication Data

US 2024/0360691 A1 Oct. 31, 2024

Related U.S. Application Data

(60) Provisional application No. 63/260,578, filed on Aug. 25, 2021.

(51) Int. Cl.
*E04H 17/16* (2006.01)
*A01K 3/00* (2006.01)
(Continued)

(52) U.S. Cl.
CPC ........... *E04H 17/166* (2013.01); *A01K 3/001* (2021.08); *A01K 15/04* (2013.01); *E04H 17/013* (2021.01)

(58) Field of Classification Search
CPC ...... A01K 1/00; A01K 1/0017; A01K 1/0029; A01K 3/001; A01K 5/01; E04H 17/013;
(Continued)

(56) References Cited

U.S. PATENT DOCUMENTS 368,205 A * 8/1887 Hapenny ................ E04H 17/18 256/26
390,667 A 10/1888 Hall
(Continued)

FOREIGN PATENT DOCUMENTS

AU 2010100947 A4 10/2010
AU 2020227118 A1 10/2020
(Continued)

OTHER PUBLICATIONS

International Search Report and Written Opinion from RO/US during international phase of instant application. 2022.
(Continued)

*Primary Examiner* — Jonathan P Masinick
(74) *Attorney, Agent, or Firm* — Definitive Patents, member Synchrony IP; Timothy D. Snowden

(57) ABSTRACT

Apparatus and methods disclosed herein relate to modular safety barrier panels with individually releasable barrier members. The barrier panel may, for example, include horizontal rails. The rails may, for example, each include a respective array of spatially distributed apertures. An array of barrier members may, for example, each be disposed through a corresponding aperture in the upper rail and into a corresponding aperture in the lower rail. One or more of the barrier members may, for example, also pass through an
(Continued)

aperture of at least one coupling member. A selectively operated closure member may, in a locked mode, prevent removal of the barrier member out of the apertures. Various embodiments may advantageously provide rapid and tool-less assembly of a modular fence panel for livestock and/or release of one or more members of the modular fence panel.

20 Claims, 10 Drawing Sheets

(51) Int. Cl.
*A01K 15/04* (2006.01)
*E04H 17/00* (2006.01)

(58) Field of Classification Search
CPC ............ E04H 17/1413; E04H 17/1417; E04H 17/1426; E04H 17/1439; E04H 17/1447; E04H 17/1488; E04H 17/1452; E04H 17/1478; E04H 17/16; E04H 17/165; E04H 17/166; E04H 17/17; E04H 17/18
See application file for complete search history.

(56) References Cited

U.S. PATENT DOCUMENTS

| | | | | | |
|---|---|---|---|---|---|
| 402,334 | A * | 4/1889 | Lane | E04H 17/18 256/25 |
| 526,039 | A | 9/1894 | Kimbrell | |
| 3,955,799 | A | 5/1976 | Lauzier | |
| 4,067,547 | A * | 1/1978 | Peters | E04H 17/1447 256/25 |
| 4,722,302 | A | 2/1988 | Gee | |
| 4,930,449 | A | 6/1990 | Harton | |
| 5,189,985 | A | 3/1993 | Brady | |
| 5,311,840 | A | 5/1994 | Rumbaugh | |
| 5,447,120 | A | 9/1995 | Eberhardt | |
| 5,509,377 | A | 4/1996 | Franklin | |
| 5,899,169 | A | 5/1999 | Jenson | |
| 5,964,452 | A * | 10/1999 | Summers | F16B 9/054 256/60 |
| 6,006,696 | A | 12/1999 | Mann | |
| 6,209,489 | B1 | 4/2001 | Akins | |
| 6,213,053 | B1 | 4/2001 | Lammers | |
| 6,386,519 | B1 | 5/2002 | Priefert | |
| 6,557,490 | B1 | 5/2003 | Vaughn | |
| 7,418,924 | B2 | 9/2008 | Klene | |
| 7,434,789 | B2 * | 10/2008 | Crumrine | E04H 17/1439 256/22 |
| 9,066,493 | B2 * | 6/2015 | Barzani | A01K 15/027 |
| 9,339,008 | B1 | 5/2016 | Getz | |
| 9,482,028 | B2 * | 11/2016 | Springborn | E04H 17/1439 |
| 9,938,747 | B2 | 4/2018 | Hancock | |
| 10,214,939 | B2 * | 2/2019 | Garza Montemayor | E04H 17/1439 |
| 11,111,693 | B1 * | 9/2021 | Luk | E04H 17/1417 |
| 11,186,996 | B2 * | 11/2021 | Springborn | E04F 11/1817 |
| 11,421,441 | B2 * | 8/2022 | Howell | E04H 17/20 |
| D1,035,044 | S * | 7/2024 | Awad | E04H 17/168 D25/48.5 |
| 2003/0033987 | A1 | 2/2003 | Elliott | |
| 2003/0168015 | A1 | 9/2003 | Vaughn | |
| 2005/0285091 | A1 * | 12/2005 | Ko | E04H 17/1488 256/24 |
| 2006/0033093 | A1 * | 2/2006 | Lo | E04H 17/1448 256/65.02 |
| 2006/0070580 | A1 | 4/2006 | Klene | |
| 2007/0044724 | A1 | 3/2007 | Kvols | |
| 2008/0029748 | A1 | 2/2008 | Ford | |
| 2008/0135823 | A1 | 6/2008 | Amendola | |
| 2009/0152522 | A1 * | 6/2009 | Underwood | E04H 17/16 256/24 |
| 2009/0314220 | A1 | 12/2009 | Groh | |
| 2010/0212597 | A1 | 8/2010 | Wolfe | |
| 2010/0263597 | A1 | 10/2010 | Kerns | |
| 2011/0001106 | A1 | 1/2011 | Lee | |
| 2013/0069027 | A1 | 3/2013 | Zimmermann | |
| 2013/0228732 | A1 | 9/2013 | Robinson | |
| 2018/0274262 | A1 * | 9/2018 | Walker | E04H 17/1439 |
| 2019/0234103 | A1 | 8/2019 | Fakhari | |

FOREIGN PATENT DOCUMENTS

| | | | | |
|---|---|---|---|---|
| CN | 210509845 U | 5/2020 | |
| DE | 871090 C * | 3/1953 | |
| DE | 29719658 U1 * | 4/1998 | |
| DE | 10225955 A1 * | 12/2003 | E04H 17/1417 |
| EP | 2725171 A1 | 4/2014 | |
| FR | 2867215 A3 * | 9/2005 | E04H 17/1447 |
| FR | 3026275 A1 * | 4/2016 | A01K 1/10 |
| GB | 2355640 A | 2/2001 | |
| JP | 6510715 B1 | 5/2019 | |
| KR | 200454364 Y1 | 7/2011 | |

OTHER PUBLICATIONS

Blain Supply Inc.. Behlen Country Poly Wall Feeder. Blain's Farm & Fleet. 2017.
Valley Vet Supply. Classic 2-In-1 Goat Feeder By Little Giant. Valleyvet.Com. 2015.
Dragonfly Farm. Low Waste Hay Feeder. Dragonfly Farm. 2011.
D-S Livestock Equipment. Goat Feeders. D-S Livestock Equipment. 2015.
Farm & PET Place. Eton Hopper Wall Mounted Poultry Feeder. Farm & Pet Place. 2017.
Pinterest. Explore Horse Stables, Horse Barns, and More!. Pinterest. 2017.
Davis, Alice. Saved From Freelandind.Com. Pinterest. 2018.
Google. Goat Hay Feeder No. Waste—Google Search. Google Search—Images. 2015.
DREWUSA81. Pictures of My Hay Feeders-Low Waste Easy to Build!. Homesteadingtoday. 2010.
Klene Pipe Structures. Hay Saver Feeders. Klene Pipe Structures. 2015.
Lazy JV Ranch. Northeast Gate Company Brand Hay Racks. Lazy Jv Ranch. 2017.
NRS World. Little Giant 20 Quart Red Fence Feeder. Nrs. 2017.
Lais. Low-Waste Wooden Goat Hay Feeder. Locust Farms. 40897.
Valley Vet Supply. Metal Hay Basket for Goats By Sydell. Valleyvet.Com. 2015.
Ohiothoughts, Elizabeth. Easy Hay Feeder. Ohio Thoughts. 2013.
Smith, Wyl. Wyl'S Hayfeeders. Old Mountain Farm. 2015.
Ramm Fence Systems, Inc. Galvanized Wall Mounted Hay Feeder. Ramm Horse Fencing & Stalls. 2017.
Tarter Farm & Ranch. Goat Bunk Feeder & Hay Rack. Tarter Farm and Ranch Equipment. 2015.
Tarter Farm & Ranch. Goat Hay Rack. Tarter Farm and Ranch Equipment. 2015.
NRS World. Priefert Goat Feeder With Hay Rack. Nrs. 2015.
Multiple Authors. Are Hayracks Safe?—Chronicle Forums. The Chronicle of the Horse. 2010.
Multiple Authors. Horse Eats Really Really Fast-Hay Net Or . . . ?—Chronicle Forums. The Chronicle of the Horse. 2010.
Multiple Authors. Messy Hay-Eater—Chronicle Forums. The Chronicle of the Horse. 2010.
Multiple Authors. The Perfect Hay Rack Reviews?—Chronicle Forums. The Chronicle of the Horse. 2010.
Multiple Authors. The Grazer Hay Feeder—Chronicle Forums. The Chronicle of the Horse. 2010.
PERFECTHAYRACK. Theperfecthayrack_02.Avi. 2017.
PERFECTHAYRACK. Theperfecthayrack_V01.Qt. 2017.
marylandcorporates.com. The Hay Rack Company, LLC—Marylandcorporates—Company Profiles of Maryland. Marylandcorporates.Com. 2013.

* cited by examiner

TOOL-LESS RELEASE ANIMAL SAFETY BARRIERS

CROSS-REFERENCE TO RELATED APPLICATIONS

This application is a US national stage application under 35 USC 371 of PCT Application Serial No. PCT/US2022/075430, titled "Tool-less Release Animal Safety Barriers" and filed by Phyllis B. Snowden, et al., on Aug. 25, 2022, which application claims the benefit of U.S. Provisional Application Ser. No. 63/260,578, titled "Safety Barriers" and filed by Phyllis B. Snowden, et al., on Aug. 25, 2021. The entire contents of the applications are incorporated herein by reference.

BACKGROUND

Animal containment systems may include pens and fences. Pens may, for example, be made from flexible fencing (e.g., net wire, individual wires, polymeric strands). Pens may, for example, be made from rigid fencing (e.g., metal tubing, plastic rods, wooden planks). Pens may, for example, be supported by posts (e.g., metal, wood, plastic). The posts may, for example, be fixed to a surface (e.g., bolted and/or welded to a concrete foundation). The posts may, for example, be fixed to the ground (e.g., partially buried). The posts may, for example, support the pens.

The pens may, for example, have horizontal and/or vertical members. The members may have varying horizontal and/or vertical spacing. Some spacing may be offered for multiple species (e.g., cattle, small ruminants, hogs). The spacing may, for example, allow an animal to protrude at least a portion of their body (e.g., legs, head, neck) between horizontal and/or vertical members.

SUMMARY

Apparatus and methods disclosed herein relate to modular safety barrier panels with individually releasable barrier members. The barrier panel may, for example, include horizontal rails. The rails may, for example, each include a respective array of spatially distributed apertures. An array of barrier members may, for example, each be disposed through a corresponding aperture in the upper rail and into a corresponding aperture in the lower rail. One or more of the barrier members may, for example, also pass through an aperture of at least one coupling member. A selectively operated closure member may, in a locked mode, prevent removal of the barrier member out of the apertures. Various embodiments may advantageously provide rapid and tool-less assembly of a modular fence panel for livestock and/or release of one or more members of the modular fence panel.

In an illustrative embodiment, a wastage filtering safety roughage dispenser (WFSRD) is disclosed. The WFSRD may, for example, be used for dispensing feedstuffs (e.g., generally fibrous feedstuffs) to animals (e.g., ruminant livestock). The WFSRD may, for example, include a roughage holding region (RHR), a roughage dispensing region (RDR), a wastage filtering catchment (WFC), a roughage protection surface (RPS), and a relocatable fixator (RF). A WFSRD may, for example, advantageously improve usability by husbandmen and animals, efficiency of dispensing feedstuffs, and/or safety of the husbandmen and animals. Various embodiments may, by way of example and not limitation, be configured for advantageous use in various environments, with various husbandry techniques, by various husbandmen, and by various species, types of animals, and individual animals.

Further embodiments and variations are disclosed with reference to the figures and remainder of the written description.

BRIEF DESCRIPTION OF THE DRAWINGS

Various embodiments of the present embodiments are described with reference to the following FIGURES. Like reference numerals therein refer to like parts throughout the various views unless otherwise specified. Embodiments and portions of embodiments illustrated and described herein are non-limiting and non-exhaustive.

Like numbers depict like elements.

DETAILED DESCRIPTION OF THE DRAWINGS

To aid understanding this document begins by introducing a tool-free release modular containment (TRMC) system with respect to FIGS. 1-4C. An illustrative ground-shippable TRMC system embodiment is disclosed with respect to FIGS. 5-6D. The discussion turns, with reference to FIGS. 7-10, to an exemplary accessorized TRMC. FIGS. This document then discloses, with respect to FIGS. 11-13, an exemplary usability-, efficiency-, and safety-enhanced roughage dispenser (WFSRD).

Figure 1:
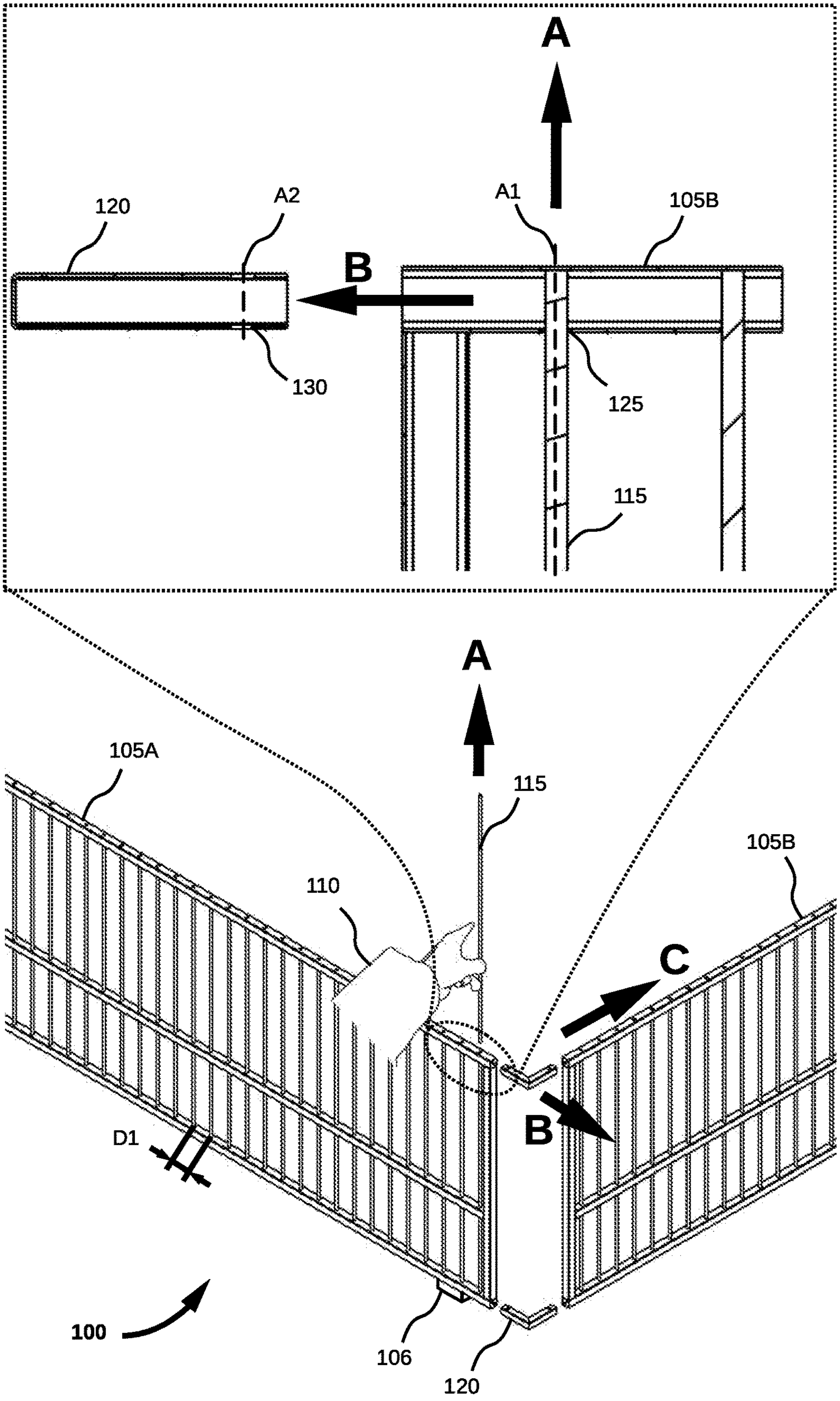
FIG. 1 depicts an exemplary tool-free release modular containment (TRMC) system in an illustrative use-case scenario.

FIG. 1 depicts an exemplary tool-free release modular containment (TRMC) system 100 in an illustrative use-case scenario. As depicted, the TRMC system 100 includes barrier panels 105 including, in the depicted example, a first barrier panel 105A and a second barrier panel 105B. The barrier panel 105A is provided with a foot 106. In the depicted scenario, the barrier panels 105 are being uncoupled, without tools, by a user 110 withdrawing a barrier member 115 by an upward motion "A". In an installed configuration, the barrier member 115 is disposed through frame members of the barrier panel 105A and through a coupling member 120. Removal of the barrier member 115 from the barrier panel 105A frees the coupling member 120 such that it may be decoupled (e.g., slidingly removed, as depicted) from the barrier panel 105A in a motion "B". The second barrier panel 105B may, as depicted, be removed (e.g., after removing a corresponding barrier member) in a motion "C".

For example, as depicted in the zoomed-in cross-section view, an aperture 125 extends through an entire thickness of a top frame member of the barrier panel 105B. The barrier member 115 is extending along a longitudinal axis A1 and is disposed through the aperture 125. The coupling member 120 is provided with an aperture 130 extending through an entire thickness of the coupling member along an axis A2. When the coupling member 120 is inserted into a lumen of the top frame member of the barrier panel 105B, and the axes A1 and A2 are brought into register (e.g., coaxial), and the barrier member 115 is disposed through the aperture 125 and the aperture 130, then the coupling member 120 is (releasably) coupled to the barrier panel 105B. As depicted, the coupling member 120 may be tool-lessly decoupled from the barrier panel 105B by removing the barrier member 115 in the motion "A" and removing the coupling member 120 in the motion "B". Accordingly, the barrier member 115 may be advantageously quickly and individually removed (e.g., to release a trapped animal) and/or installed without tools. The barrier panel 105 may, for example, advantageously be quickly released and/or coupled (e.g., field-assembled) without tools.

In the depicted example, the barrier members 115 are separated by a distance D1. The distance D1 may, for example, be selected to prevent an animal from extending a body portion (e.g., head) between the barrier members 115. The distance D1 may, for example, be selected for a target species (e.g., goats, sheep, cattle, dogs) and/or age (e.g., <3 months, 3-6 months, 6-12 months, 12+ months). In some embodiments, the distance D1 may be substantially identical between every barrier member 115 and between the last barrier member in a panel and a vertical frame member. Accordingly, such embodiments may advantageously prevent entrapment of animals by providing a substantially identical spacing in all locations.

Figure 2:
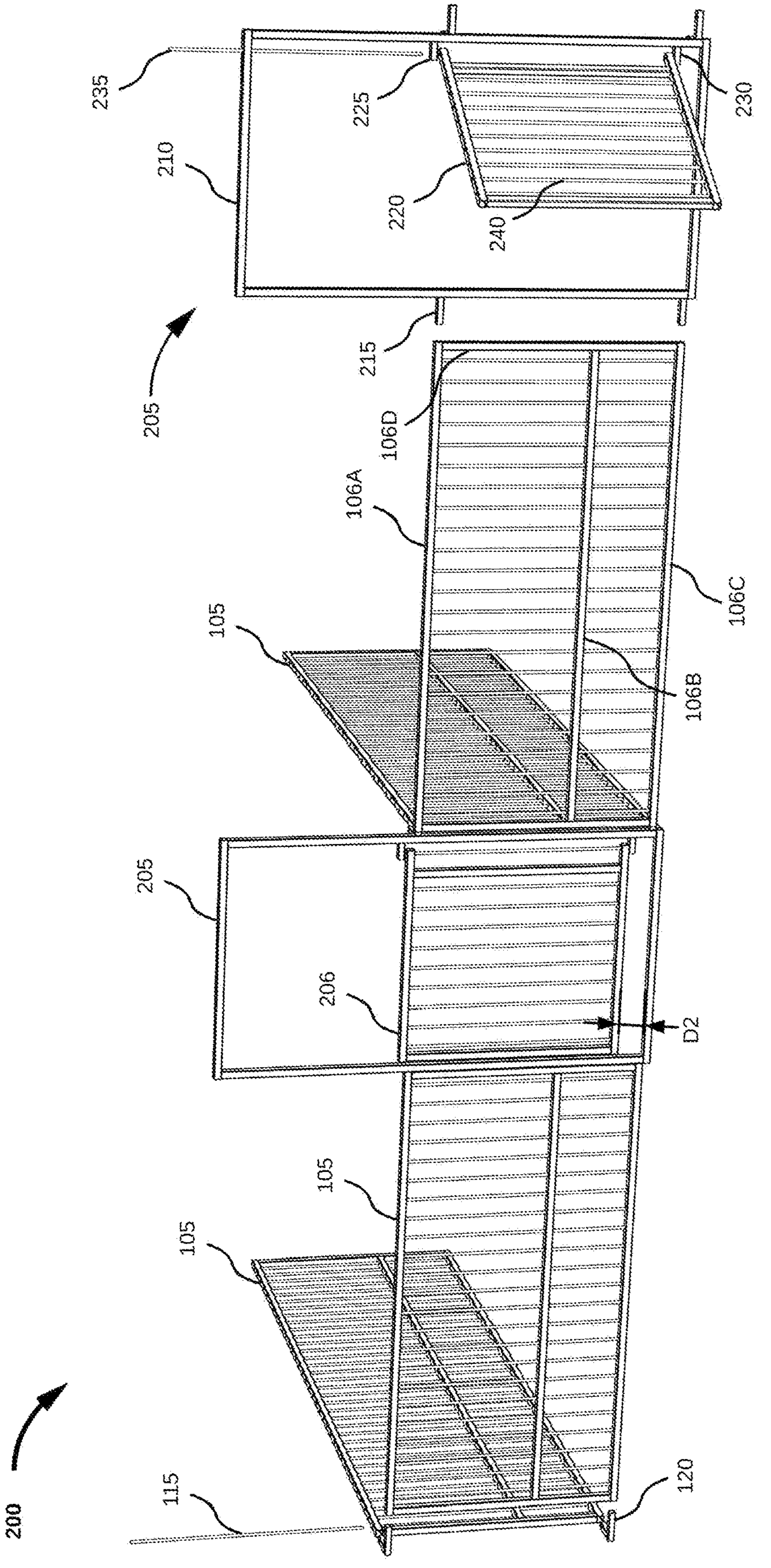
FIG. 2 depicts an exemplary TRMC system depicting an illustrative tool-free assembly process.

FIG. 2 depicts an exemplary TRMC system 200 depicting an illustrative tool-free assembly process. As depicted, the TRMC system 200 includes the barrier panels 105 coupled together by coupling members 120 and barrier members 115. The panel 105 includes a top rail 106A and a bottom rail 106C, each extending along substantially parallel longitudinal axes, and coupled together at a separation distance (e.g., predetermined) by vertical posts 106D.

In the depicted example, a third rail 106B is also provided. The barrier members 115 pass through corresponding apertures in the third rail 106B. For example, the third rail 106B may advantageously provide additional support (e.g., to prevent bending) to the barrier members 115. Accordingly, for example, smaller (e.g., less expensive) barrier members may be used.

Figure 3:
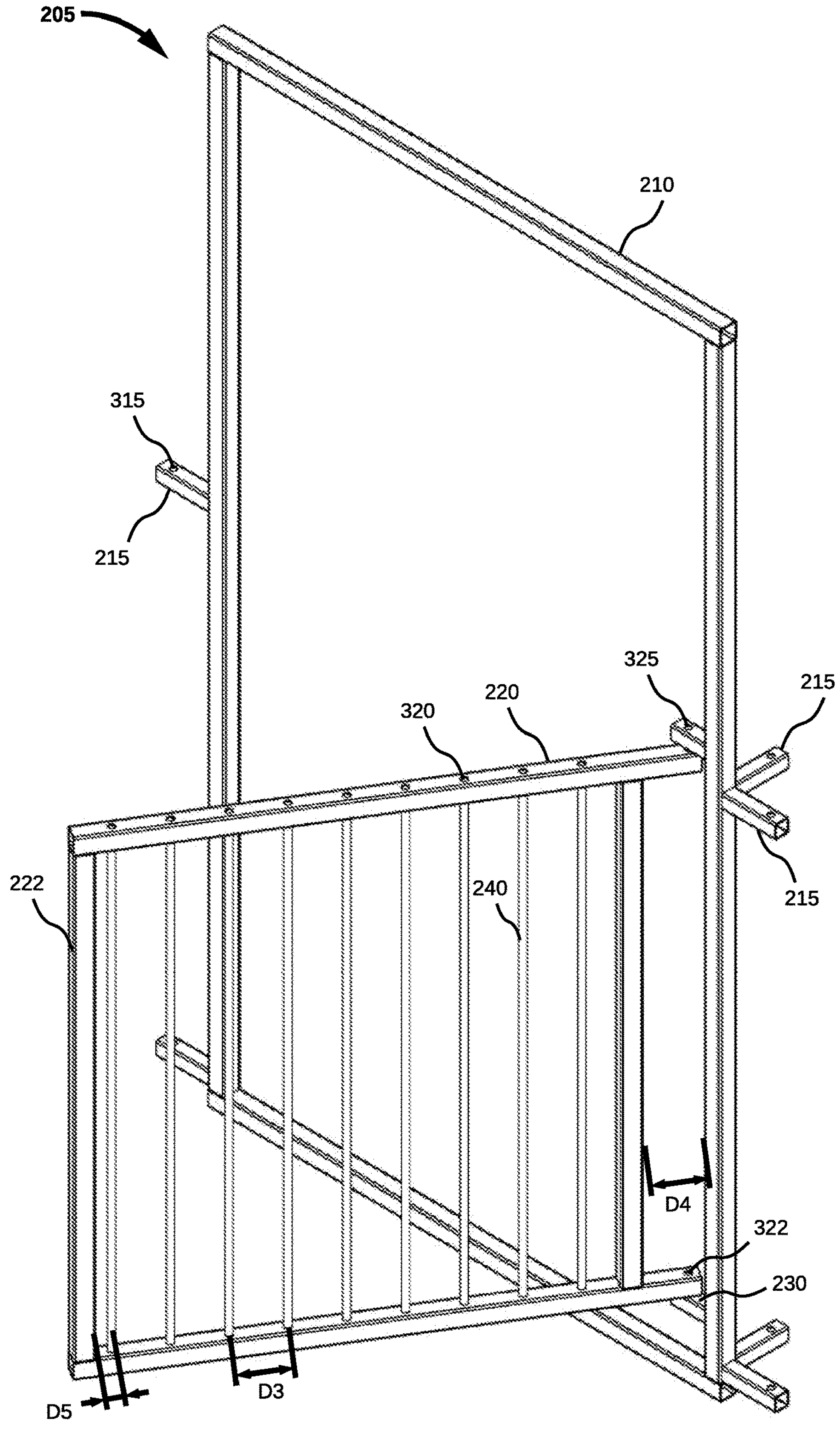
FIG. 3 depicts an exemplary gate panel of the exemplary TRMC system.

FIG. 3 depicts an exemplary gate panel of the exemplary TRMC system. The TRMC system 200, as shown in FIG. 2, includes gate panels 205. A gate panel 205, as depicted, includes a gate 206 hingedly and releasably coupled to a gate frame 210. Coupling members 215 are coupled to (e.g., bolted, pinned, welded) and extend outward (e.g., orthogonally) to the gate frame 210. At least one aperture 315 in each coupling member 215 enables the coupling member 215 to be brought into registration (e.g., inside of) a barrier panel 105 (e.g., brought into coaxial relationship with aperture 125) and coupled to the barrier panel 105 by a barrier member 115 being disposed (e.g., 'dropped', inserted) through the aperture(s) 315 in the coupling member(s) 215. Accordingly, the gate panel 205 may, for example, be advantageously releasably and toollessly coupled and/or decoupled from the barrier panel 105.

As depicted, the gate 206 is provided with a gate frame 220, with upper and lower rails extending past one of the vertical frame members 222 of the gate frame 220 on one side. The upper and lower rails are each provided with apertures 322 (e.g., through holes). The gate frame 210 is provided with a coupling member 225, having an aperture 325 therethrough. The gate frame 210 is provided with a coupling member 230, having an aperture (not shown) at least partially extending therethrough (e.g., the aperture may extend downwards from the top but may, for example, not extend through a bottom surface of the coupling member 230). When the apertures 322 in the upper and lower rails of the gate frame 220 are brought into register with the aperture 325 in the coupling member 225 and the aperture in the coupling member 230, and a barrier member 235 (removed in the view shown in FIG. 3 for ease of viewing) is disposed through the corresponding (e.g., coaxial) apertures 322 of the coupling members and the gate frame, then the gate 206 is tool-lessly, hingedly, and releasably coupled to the gate panel 205. The barrier member 235 may, for example, be selected to have a height to match a distance between the coupling members 225 and 230.

The gate is further provided with barrier members 240, which may, for example, have a length and/or cross-sectional area sized for the gate (as depicted). The barrier members 240 may, for example, be configured to permit individual, tool-free removal and/or insertion of the barrier members 240 with respect to the gate 206. As shown, the barrier members 240 are disposed through apertures 320 extending through the upper rail of the gate frame 220, and into corresponding apertures in the lower rail of the gate frame 220.

In the depicted example, the barrier members 240 are spatially distributed and separated by a distance D3. The distance D3 may, by way of example and not limitation, equal the distance D1. In some embodiments, the distance D3 may be lesser or greater than the distance D1. The distance D3 may, for example, be selected to avoid entrapment and/or prevent undesired behavior (e.g., standing on the gate panel).

The outermost barrier members 240 are each separated from the corresponding vertical member 222 by a distance D5. In some embodiments (not shown) the distance D5 may, for example, equal the distance D3.

The 'hinge-side' vertical frame member 222 is separated from the gate frame 210 by a distance D4 when the gate 206 is coupled to the gate frame 210 by the barrier member 235. In some embodiments, D4 may be measured from the hinge-side frame member 222 to the 'hinge' barrier member 235. In such embodiments, the distance D4 may be equal to D1, D3, and/or D4. For example, the distance D4 may be selected to prevent entrapment and/or protrusion of a target animal body part between the frame member 222 and the barrier member 240.

In some embodiments, by way of example and not limitation, the distance between the barrier member 240 and the frame 210 and/or the distance between the 'latch-side' barrier member and the frame 210 may be selected to prevent protrusion of an animal body portion therethrough (e.g., legs, hooves, paws).

Figure 4A:
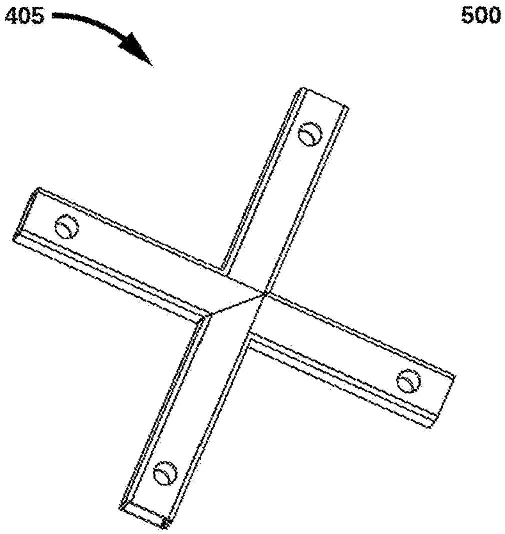
FIG. 4A, FIG. 4B, and FIG. 4C depict exemplary couplers of the exemplary TRMC system.
Figure 4B:
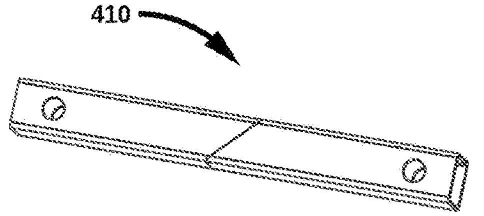
Figure 4C:
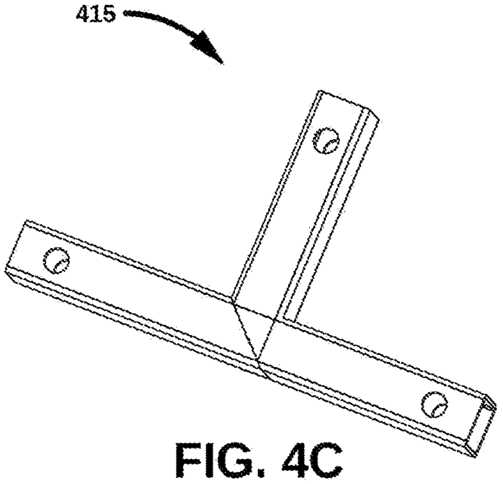

FIG. 4A, FIG. 4B, and FIG. 4C depict exemplary couplers of the exemplary TRMC system. A 4-way coupler 405 may, for example, be configured to couple together (e.g., along perpendicular axes) four barrier panels 105 and/or other barrier modules, such as depicted at least with reference to FIG. 1.

A linear coupler 410 may, for example, be configured to couple together (e.g., along a longitudinal axis) two barrier panels 105 and/or other barrier modules, such as depicted at least with reference to FIG. 1.

A three-way coupler 415 may, for example, be configured to couple together (e.g., along orthogonal axes) three barrier panels 105 and/or other barrier modules, such as depicted at least with reference to FIG. 1.

In various embodiments, couplers may be configured to couple along non-orthogonal axes (e.g., 45 degrees, 30 degrees, 120 degrees).

Figure 5:
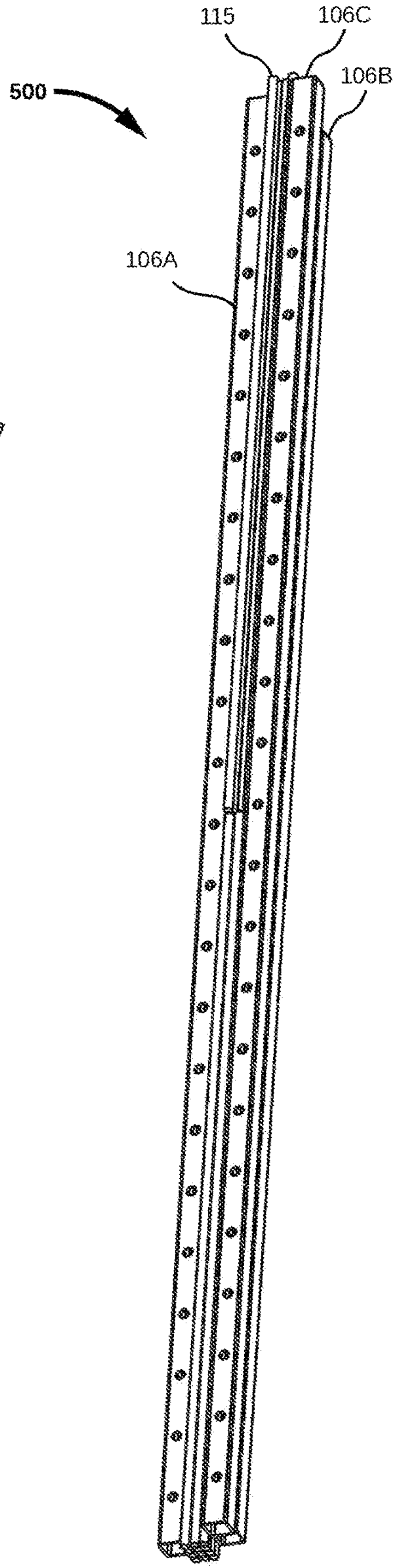
FIG. 5 depicts an illustrative TRMC panel in an illustrative shipping mode.

FIG. 5 depicts an illustrative TRMC panel in an illustrative shipping mode. In the depicted shipping-mode panel 500, the upper rail 106A, the lower rail 106B, and the third rail 106C are oriented such that their respective longitudinal axes are substantially parallel. The corresponding barrier members 115 (e.g., one for each aperture in the rails) are also oriented such that their respective longitudinal axes are substantially parallel to each other and to the longitudinal axes of the rails. In some embodiments, vertical members (e.g., as disclosed at least with reference to FIGS. 1-3, 6A-6D, and/or 10) may be included (e.g., also substantially parallel). In some embodiments, coupling members (e.g., as disclosed at least with reference to FIGS. 4A-4C) may be included.

In the depicted example, a width and height may be substantially smaller than a length (e.g., along the longitudinal axis). For example, a girth measurement (e.g., for standard 'parcel-type' ground shipping) may be below a predetermined threshold (e.g., established by a carrier). By modular (e.g., tool-free) disassembly, a compact arrangement is enabled such that the girth measurement may be much smaller in the shipping mode then in an assembled mode. Accordingly, shipping costs may be advantageously reduced and/or item availability (e.g., to rural users) may be advantageously increased. Storage costs may, for example, be advantageously reduced. The tool-free coupling disclosed at least with reference to FIG. 1 enables rapid, tool-free assembly of the panel into a deployed mode (e.g., as shown in FIGS. 1-2). In some embodiments, such as shown, few or no specialized parts and/or fasteners are needed (e.g., because the barrier members act as fasteners).

Figure 6D:
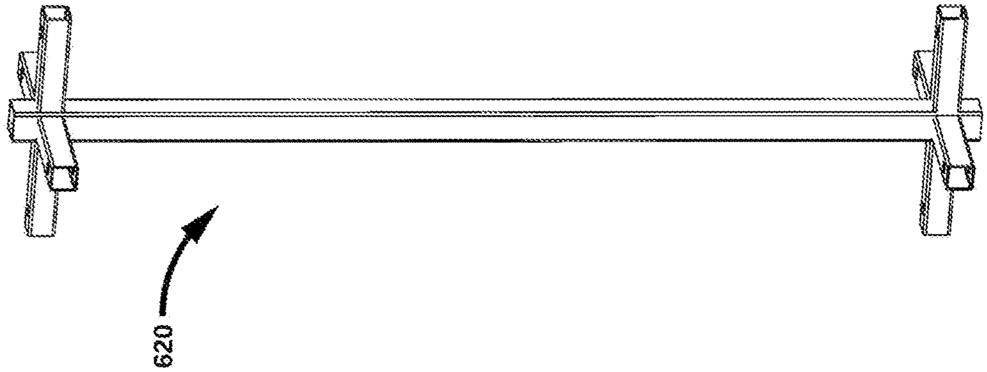
FIG. 6A, FIG. 6B, FIG. 6C, and FIG. 6D depict illustrative TRMC panel couplers which may, by way of example and not limitation, be used with the TRMC panel depicted in FIG. 5.
Figure 6C:
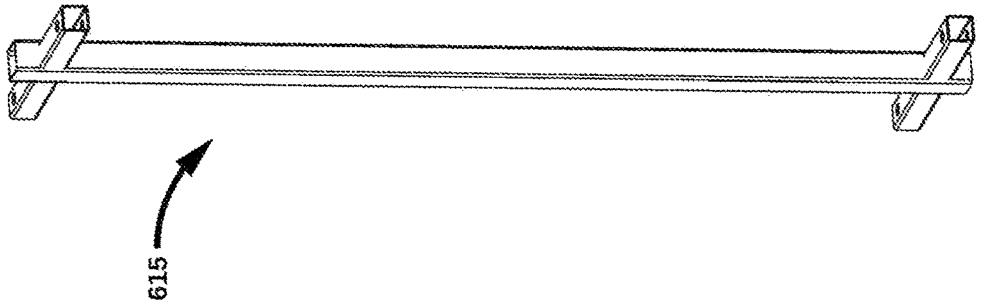
Figure 6B:
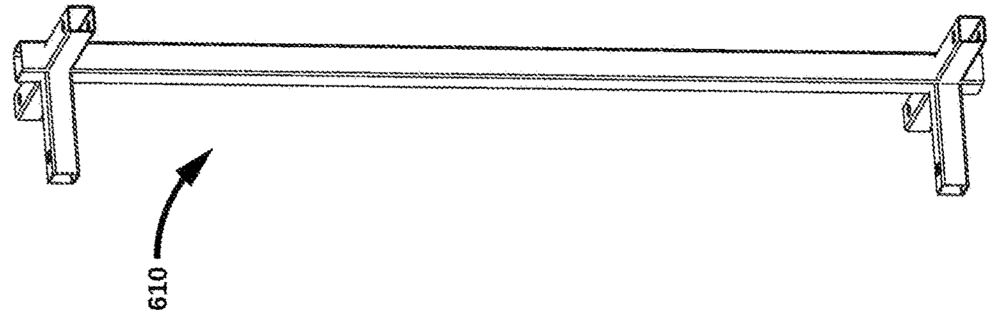
Figure 6A:
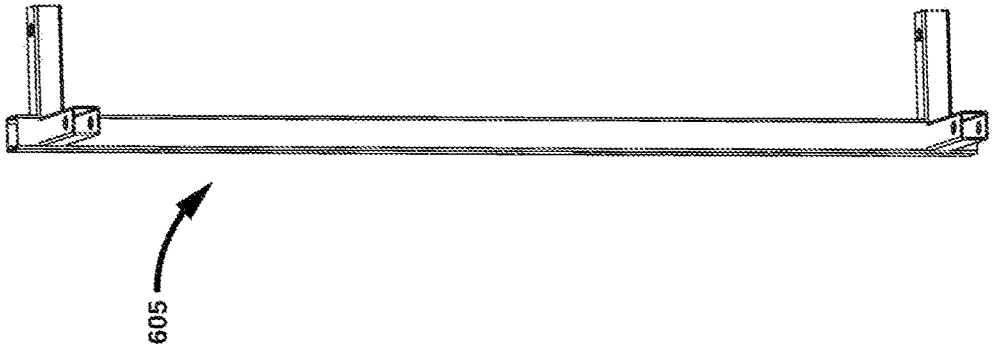

FIG. 6A, FIG. 6B, FIG. 6C, and FIG. 6D depict illustrative TRMC panel couplers which may, by way of example and not limitation, be used with the TRMC panel depicted in FIG. 5. A corner dual panel coupler and vertical frame member 605 is shown in FIG. 6A. A three-way dual panel coupler and vertical frame member 610 is shown in FIG. 6B. A linear dual panel coupler and vertical frame member 615 is shown in FIG. 6C. A four-way dual panel coupler and vertical frame member is shown in FIG. 6D. The dual panel coupler and vertical frame members 605, 610, 615, and/or 620 may, for example, be used in place of the vertical frame member(s) 106D. Such embodiments may, for example, advantageously enable the shipping mode shown in FIG. 5.

Figure 7:
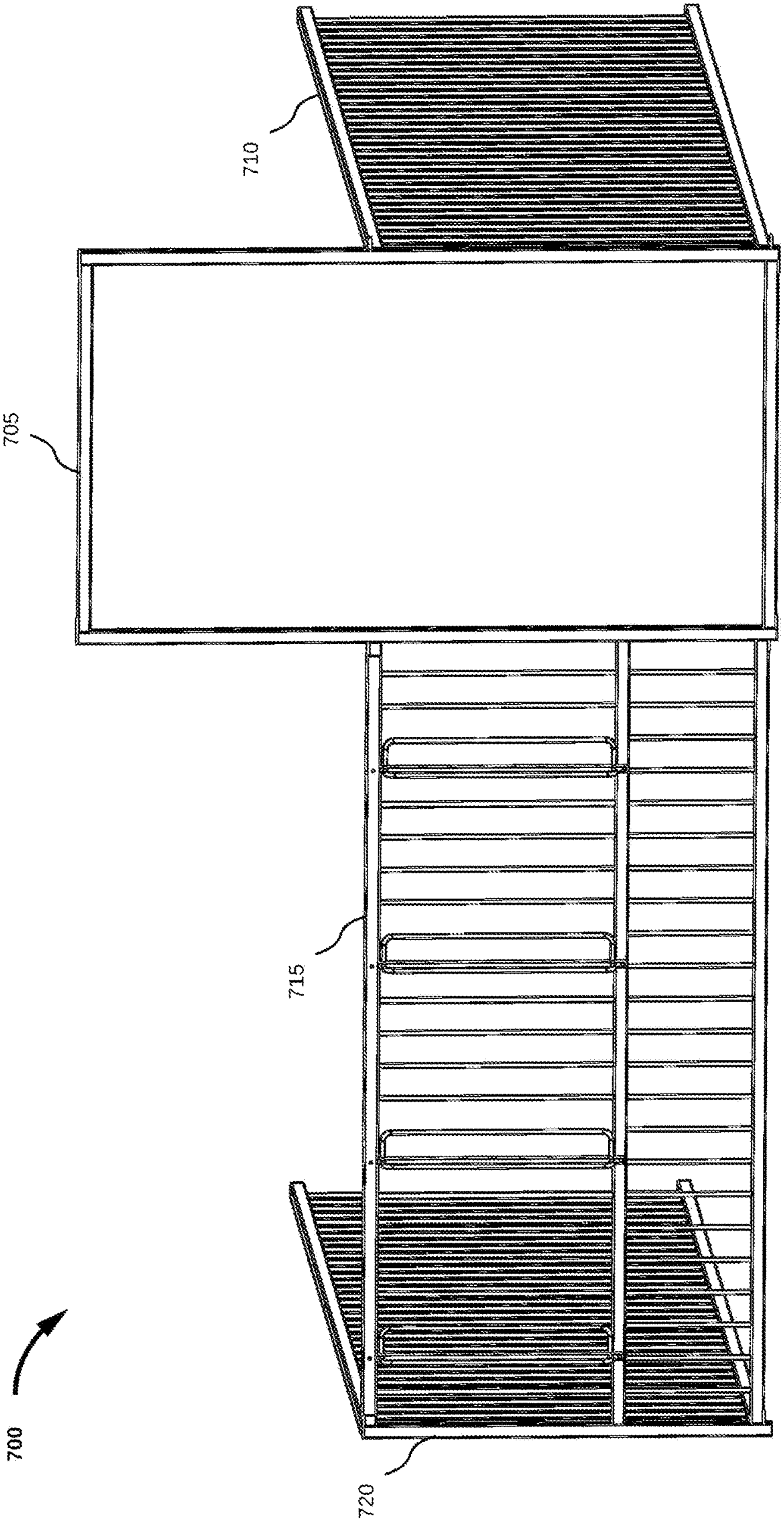
FIG. 7 depicts an exemplary accessorized TRMC system.
Figure 8:
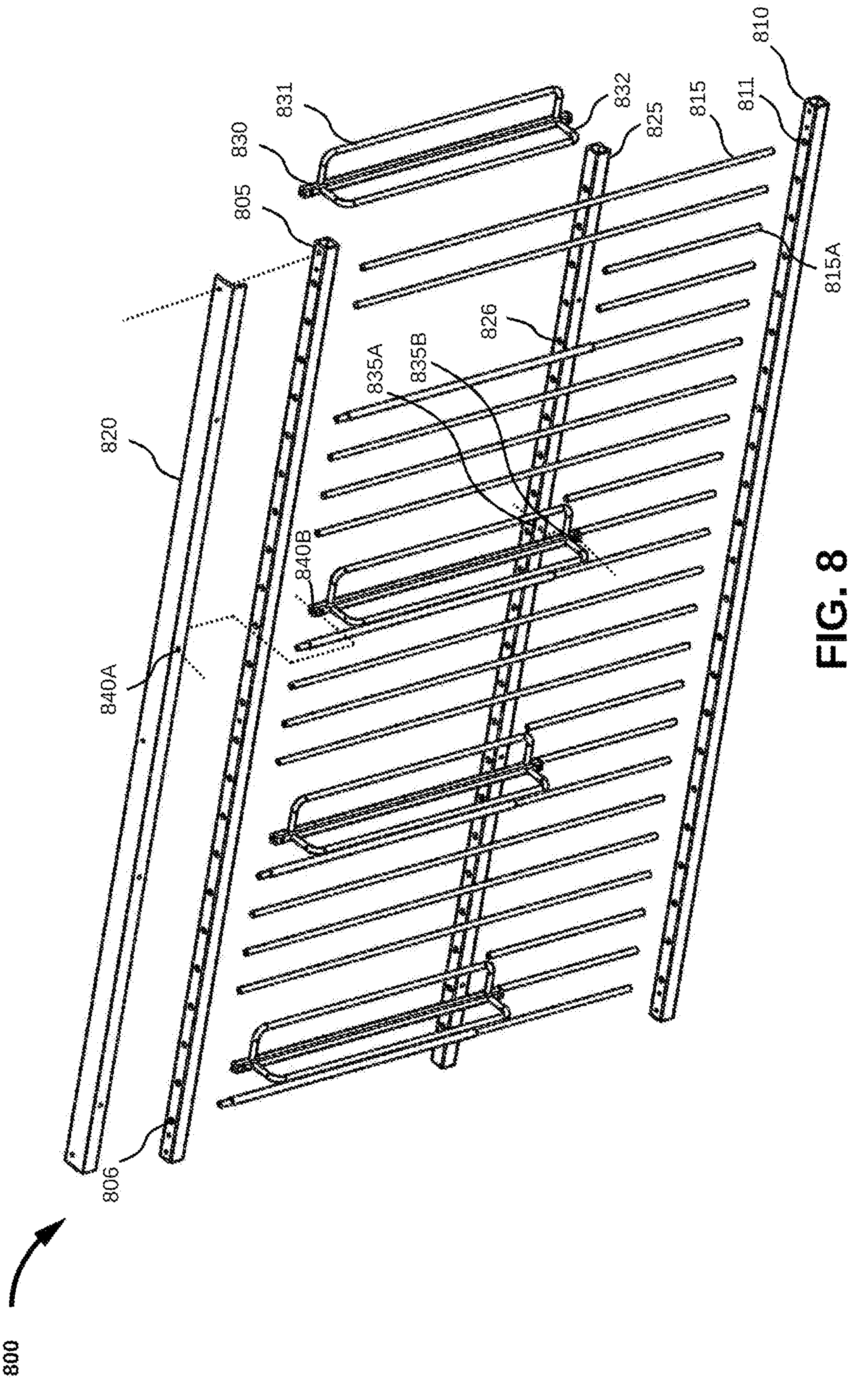
FIG. 8 depicts an exemplary stanchion panel of the TRMC system depicted in FIG. 7.
Figure 9:
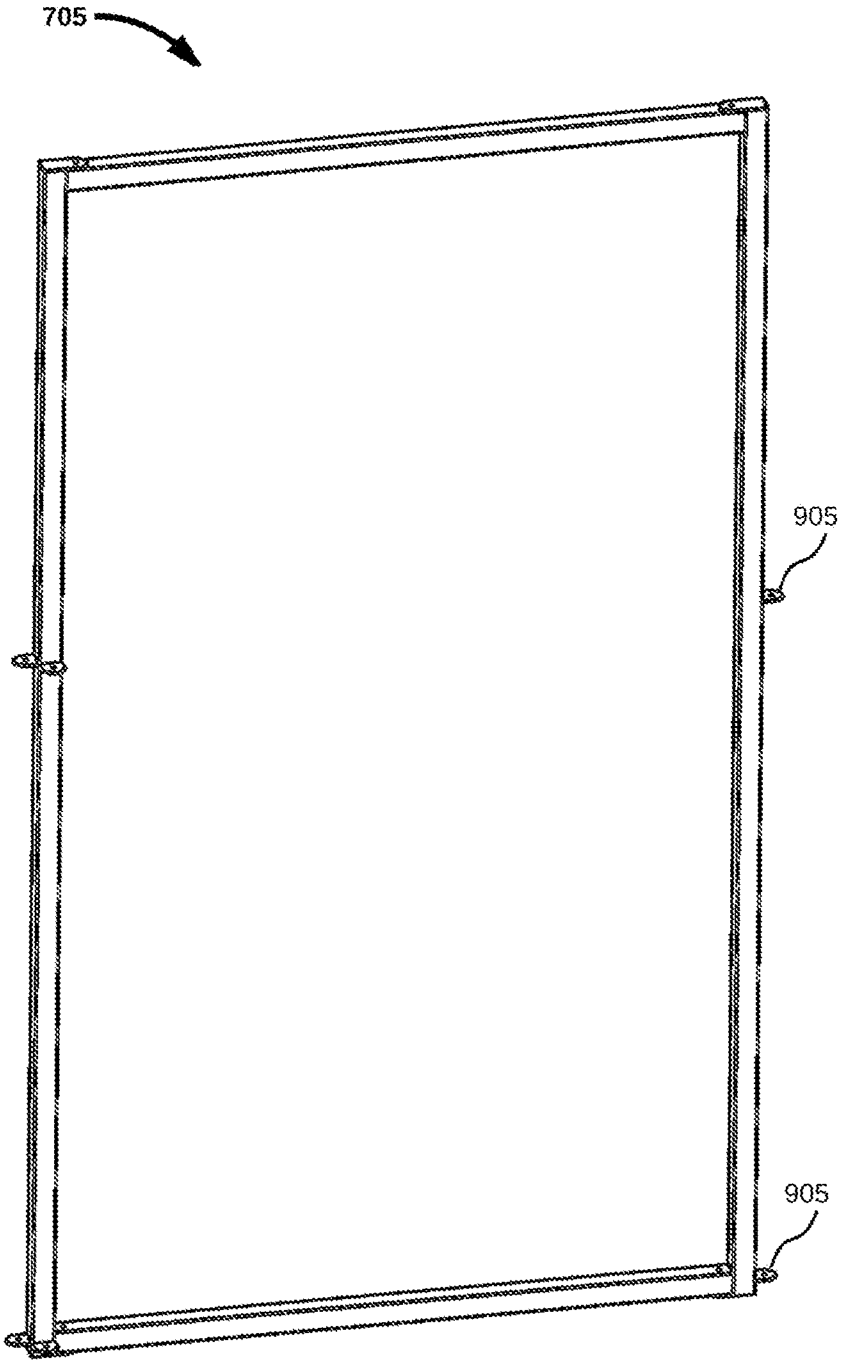
FIG. 9 depicts an exemplary gate panel of the TRMC system depicted in FIG. 7.
Figure 10:
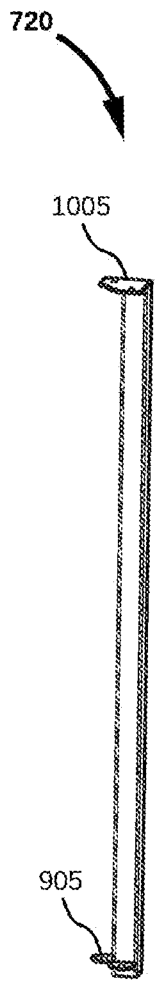
FIG. 10 depicts an exemplary vertical post of the TRMC system depicted in FIG. 7.

FIG. 7 depicts an exemplary accessorized TRMC system. FIG. 8 depicts an exemplary stanchion panel of the TRMC system depicted in FIG. 7. FIG. 9 depicts an exemplary gate panel of the TRMC system depicted in FIG. 7. FIG. 10 depicts an exemplary vertical post of the TRMC system depicted in FIG. 7.

In the depicted example in FIG. 7, an exemplary TRMC system 700 includes a gate module 705. The gate module 705 is releasably coupled to a first barrier panel 710. The gate module 705 is further releasably coupled to a stanchion barrier panel 715. The stanchion barrier panel 715 is releasably coupled to a second barrier panel 710. As depicted, the stanchion barrier panel 715 and the second barrier panel 710 are releasably coupled by a coupling module 720. The coupling module 720 may, for example, act as a mechanical support (e.g., 'post') for the TRMC system 700.

As shown in FIG. 7 and in an exploded view 800 in FIG. 8, a barrier panel 715 includes a top frame member 805 (e.g., a top 'rail') and a bottom frame member 810 (e.g., a bottom 'rail') which together operate to capture a (linear) array of vertical members 815 (e.g., 'barrier members'). The vertical members 815 may, as depicted, include rods (e.g., circular cross-section). In some embodiments, by way of example and not limitation, the vertical members 815 may be provided with a non-circular cross-section.

A vertical member 815 may be individually (e.g., toollessly) removed through corresponding apertures in the top frame 805 and the bottom frame 810. For example, the bottom frame 810 may have apertures 811 in an upper surface. The apertures 811 may, for example, be configured to (slidingly) receive the vertical member 815 therethrough. A bottom wall of the bottom frame 810 may be solid. For example, cavities may be formed in the bottom frame 810 such that the vertical members 815 may be inserted into the bottom frame 810 and supported thereby. The vertical members 815 may, for example, be removed from the bottom frame 810 by, for example, sliding the vertical member 815 from the bottom frame 810 along a longitudinal axis of the vertical member 815.

An (array of) apertures 806 may be provided entirely through the top frame 805 such that the vertical member 815 may be inserted through and/or removed through the top frame 805. Accordingly, the panel 715 may be assembled, for example, by assembling a frame containing the bottom frame 810 and the top frame 805, with the vertical members 815 inserted into the corresponding cavities in the bottom frame 810 and in the apertures through the top frame 805. Once assembled, an individual vertical member 815 may, for example, be individually removed from the panel 715 by withdrawing the vertical member 815 through the aperture in the top frame 805. Such embodiments may, by way of example and not limitation, advantageously allow a trapped animal, for example, to be quickly and/or easily freed without tools by a caretaker. For example, the caretaker may simply remove one or more vertical members 815. Various embodiments may, for example, allow reduction in shipping and/or assembly cost by manufacture and/or shipment of the individual components, and on-site (e.g., tool-free) assembly.

In the depicted example, a cap member 820 (e.g., a 'closure member') is provided. The cap member 820 may, for example, be (releasably) coupled to the top frame 805 to occlude the apertures through the top frame 805. The cap member 820 may, for example, advantageously prevent accidental withdrawal of the vertical members 815 (e.g., by an unsupervised animal). The cap may, for example, be releasably coupled to the top frame 805 by coupling members (e.g., knurled-head machine screws, latches) which may be toollessly removed to permit removal of a vertical member 815. The cap member 820 may, for example, be hingedly coupled to the top frame 805 such that the cap may be hinged down to permit access to the apertures in the top frame 805. As depicted, the cap member 820 is provided with an "L-shaped" cross-section. The cross-section may advantageously prevent bending of the occlusive surface. Accordingly, the vertical members 815 may be prevented from being allowed sufficient travel to escape from a cavity of the bottom frame 810 without operation of the cap member 820 into a released mode.

In the depicted example, the panel 715 is further provided with an intermediate frame member 825 (e.g., an intermediate 'rail'). The intermediate frame member 825 may, for example, have through apertures 826. For example, in some embodiments the intermediate frame member 825 may be identical to the top frame 805. In some embodiments (e.g., as depicted with respect to FIGS. 1-2), the intermediate frame member 825 may be shorter than the top frame and/or bottom frame member.

In some embodiments, an intermediate cap member (not shown) may, for example, be provided. The intermediate cap member (e.g., an 'intermediate closure member') may be provided with apertures to allow at least some vertical members 815 to pass through the intermediate frame member 825. The intermediate cap member may, for example, have regions with no apertures. The regions with no apertures may, for example, trap shorter vertical members 815A (e.g., extending between the intermediate frame member 825 and the bottom frame 810). Such regions may, for example, allow a partial-height opening in the barrier panel (e.g., corresponding to an opening for a stanchion and/or a feeder).

In some embodiments, shorter vertical members (not shown) may extend, for example, between an intermediate frame member and, for example, the top frame member. Such embodiments, for example, may advantageously support the bottom of the shorter barrier member in an aperture in a lower frame member (e.g., bottom-most intermediate frame member) and/or on a solid portion of a cap member. Such embodiments may advantageously enable a partial-height opening in the barrier panel (e.g., below the intermediate frame member).

In some embodiments, a panel (e.g., barrier panel 105, a panel 710) may, for example, be converted by an accessory kit into the stanchion panel 715. For example, a kit of the shorter vertical members 815A, an intermediate cap member, the top cap member 820, and/or stanchions 830 may be provided. The kit may, for example, be used to convert a 'standard' panel into an 'accessorized' (e.g., stanchion) panel.

Stanchions 830 are provided in the depicted example. The stanchions 830 correspond to partial-height openings in the barrier panel 715. For example, the stanchions 830 may be pivotably connected to the intermediate frame member 825 such that the stanchion 830 may be operated into an open mode to allow an animal head to pass through, and into a closed mode to (temporarily) restrain an animal in the panel 715. The stanchion 830 may, for example, be (e.g., releasably) hingedly coupled by a pin (not shown) through an aperture 835B in the stanchion 830 and through an aperture 835A in the intermediate frame member 825. The stanchion 830 may, for example, be (releasably) coupled into a closed and/or open mode by operating a pin (e.g., extending through an aperture 840B in the stanchion 830) through an aperture 840A in an upper end of the stanchion 830 and into the top frame 805.

In some embodiments, a ratchet and/or pawl (not shown) may operate to automatically close the stanchion 830 in any position at which it is stopped. A release lever may, for example, release the pawl to permit the stanchion 830 to be operated into an open position.

In some embodiments a stanchion retainer (not shown) may be provided attached, for example, to the top frame. The stanchion retainer may substantially shield an upper end of the stanchion from contact with an animal and/or human. The stanchion retainer may, for example, form a "U"-shape substantially parallel to the top frame. The stanchion retainer may define a lateral range of motion of an upper end of the stanchion (e.g., in a plane substantially parallel to the stanchion panel). The stanchion retainer may, for example, substantially prevent rotation of the stanchion retainer out of the plane parallel to the stanchion panel. In some embodiments the stanchion panel may be provided with holes (e.g., in an arc) configured to register with a hole in the stanchion 830.

As depicted, the stanchion 830 is provided with a first extension 831 parallel to a plane of the panel 715. The first extension 831 may, for example, substantially occlude an opening remaining in the panel 715 when the stanchion 830 is in the closed mode. The first extension may, for example, ensure that when in the closed mode, a maximum aperture width through the barrier panel 715 is maintained. The stanchion 830 is provided, in the depicted example, with a second extension 832 orthogonal to the first extension 831. The second extension 832 may, for example, prevent an animal from reaching around to interact with a second animal in an adjacent stanchion opening.

In some embodiments a vertical frame member 720 may be releasably coupled to, for example, two frame members (e.g., the top frame member 805, the intermediate frame member 825, and/or the bottom frame 810). The vertical frame member 720 may, for example, constrain the top frame 805 and the bottom frame 810 at a (predetermined) (maximum) distance apart.

In some embodiments, a vertical member may, for example, pass through apertures in the vertical frame member, and through at least one of the horizontal frame members. Accordingly, by way of example and not limitation, a vertical member 815 may be used to couple the vertical frame member to the panel 715.

In some embodiments at least one vertical frame member may be fixedly coupled to the horizontal frame members (e.g., 805, 815, and/or 810). The vertical frame member(s) may, by way of example and not limitation, be welded, bolted, and/or screwed.

In some embodiments, such as depicted at least with reference to FIGS. 1-4C, a coupling member (e.g., coupling member 120, coupling member 215, coupling member 405, coupling member 410, coupling member 415) may be configured to slidably engage a frame member (e.g., top frame member 805, bottom frame member 810, and/or intermediate frame member 825). The frame member may, for example, be substantially horizontal. The coupling member may, for example, be configured to slide into a lumen of the horizontal frame member (e.g., top frame 805), along a longitudinal axis of the horizontal frame member. An aperture of the coupling member may register with an aperture in the horizontal frame member (e.g., 806 of 805, 826 of 825, and/or 811 of of 810). A vertical member 815 may be assembled through the apertures, including the aperture in the coupling member, thereby (releasably) coupling the coupling member to the panel 715. Accordingly various embodiments may, for example, be releasably and toollessly assembled. For example, various panels may be assembled and/or disassembled without tools.

A gate module 705 (e.g., depicted in FIG. 9) includes a frame configured to receive a gate. The gate may, for example, be swinging. The gate panel 705 is provided with coupling members 905 configured to releasably couple to a panel (e.g., panel 710, panel 715).

In some embodiments the gate panel 705 may be provided, for example, with a coupling module such as disclosed at least with reference to FIG. 3. The coupling module may, for example, be (fixedly) coupled (e.g., welded, bolted, pinned) to the gate frame 705. The coupling module may, for example, be configured to extend from the gate frame 705 and (releasably) couple to a panel, such as by a vertical member passing through at least one aperture (e.g., such as an aperture in a coupling member) in the coupling module. In various embodiments the coupling module may be configured to releasably couple to one or more panels, such as, for example, in a linear configuration (e.g., such as linear coupler 410), a 90-deg configuration (e.g., such as coupling member 120), a t-configuration (e.g., such as three-way coupler 415), or some combination thereof.

In some embodiments, a modular gate panel may be provided such as, for example, is disclosed at least with reference to FIG. 3. The gate panel may, for example, include a frame. The frame may, for example, have at least an upper frame member and a bottom frame member. Vertical members may be disposed (e.g., in a linear array), for example, in cavities in the bottom frame and engaged in apertures in the upper frame member. A hinge member may, for example, be coupled to the gate frame 705 (e.g., one below and/or one above an intended gate position). A vertical member (e.g., with extended length) may, for example, engage a cavity in a lower hinge member, pass through an aperture in the bottom frame of the gate, pass through an aperture in the upper frame, and engage an aperture in an upper hinge member. The gate may, for example, be advantageously (e.g., toollessly) removed from the gate frame 705 by removing the vertical member. A cap (e.g., a 'closure member') may be releasably coupled to the upper hinge member to prevent accidental removal and/or displacement of the vertical member (e.g., to resist animals sliding a barrier member and/or vertical member out of an aperture such that it is released from the panel).

A vertical frame member 720 is depicted in FIG. 10. The vertical frame member 720 is provided with a first coupling module 905 and a second coupling module 1005. As depicted, the vertical frame member 720 is configured as a corner coupling frame.

In some embodiments, a vertical frame member (e.g., vertical frame members 605-620) may include a vertical support. The vertical frame member may further include coupling modules (e.g., configured such as described with reference to FIGS. 1-4C) coupled (e.g., fixed) to the vertical support (e.g., as disclosed at least with reference to FIGS. 6A-6D). The coupling module may, for example, be provided with a through aperture. The aperture may, for example, be configured to allow a vertical member (e.g., vertical member 815) to be assembled through the aperture. The coupling module may, for example, be configured to slidably assemble (e.g., into) a horizontal frame member (e.g., top frame member 805, intermediate frame member 825, and/or bottom frame member 810).

In some embodiments a vertical support may, for example, be omitted. For example, a panel may be assembled into a frame without need of vertical supports (e.g., vertical supports may be integrated into and/or assembled with the panel). Coupling modules may, for example, be provided without a vertical support. For example, a coupling module may be coupled to corresponding horizontal frame members of two or more panels. A straight coupler (e.g., linear coupler 410) may, for example, be used to couple two panels in a straight line. A t-coupler (e.g., three-way coupler 415) may, for example, be used to couple three panels at 90-degrees from each other. An L-coupler (e.g., coupling member 120) may, for example, be used to couple two panels at 90-degrees from each other. Various other couplers may, for example, be provided. Various couplers may, for example, be provided with a vertical support (e.g., vertical frame members 605-620).

Figure 11:
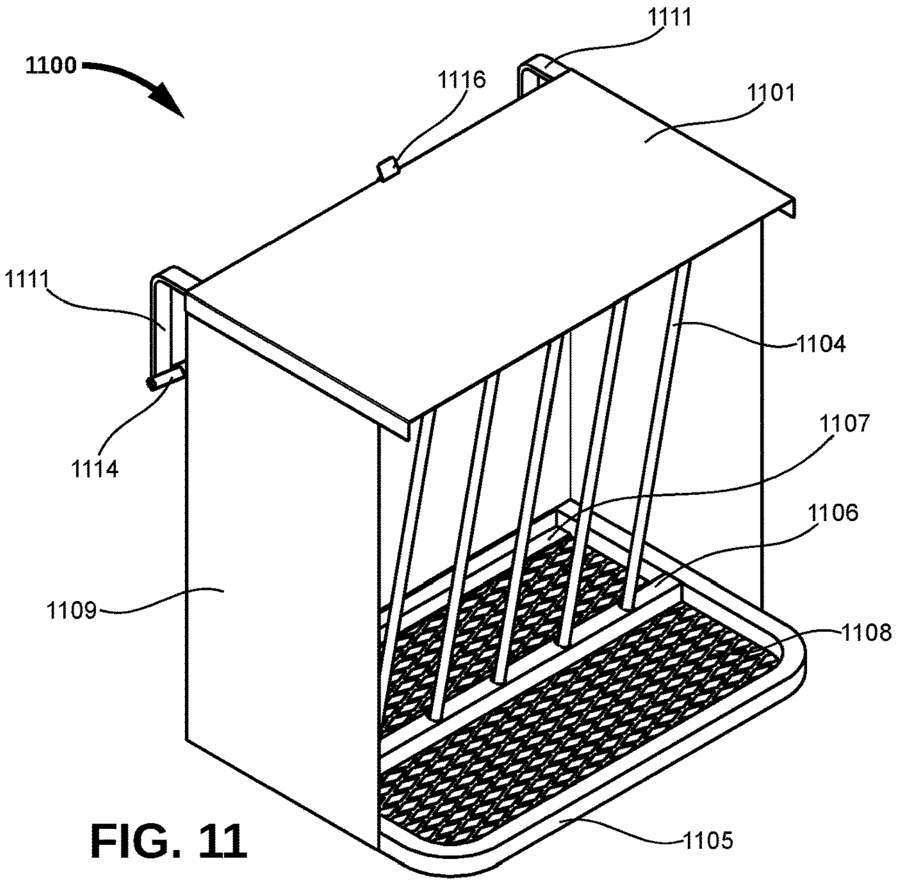
FIG. 11, FIG. 12, and FIG. 13 depict an exemplary roughage feeder.
Figure 12:
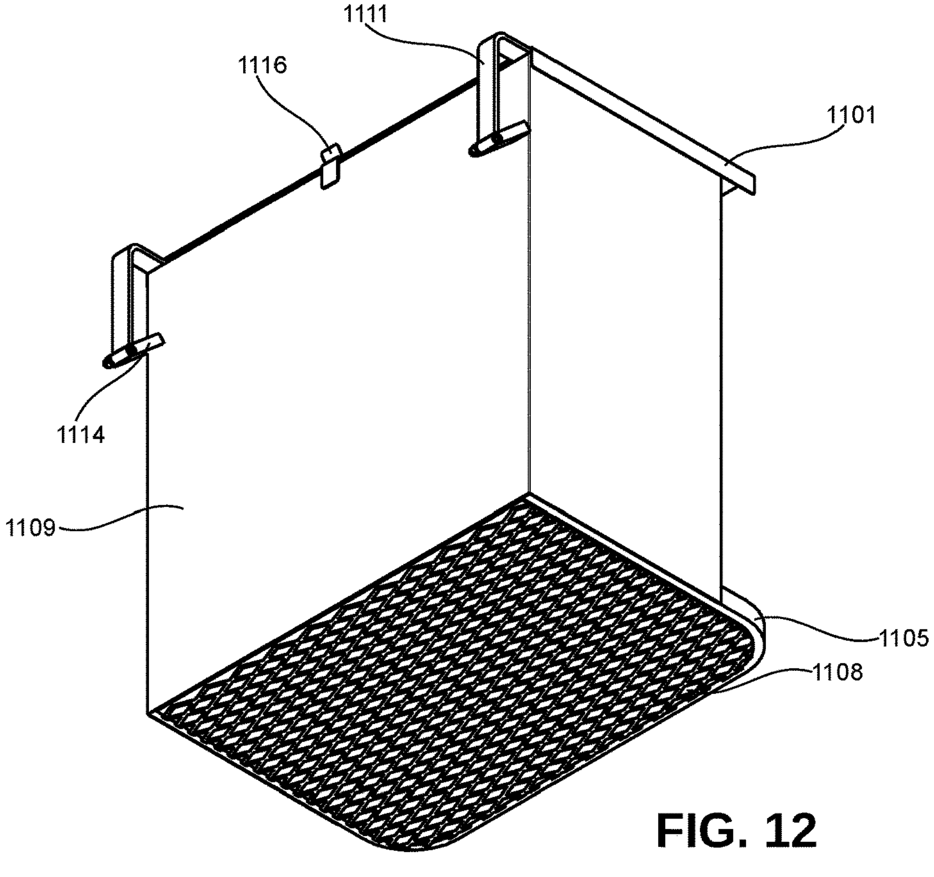
Figure 13:
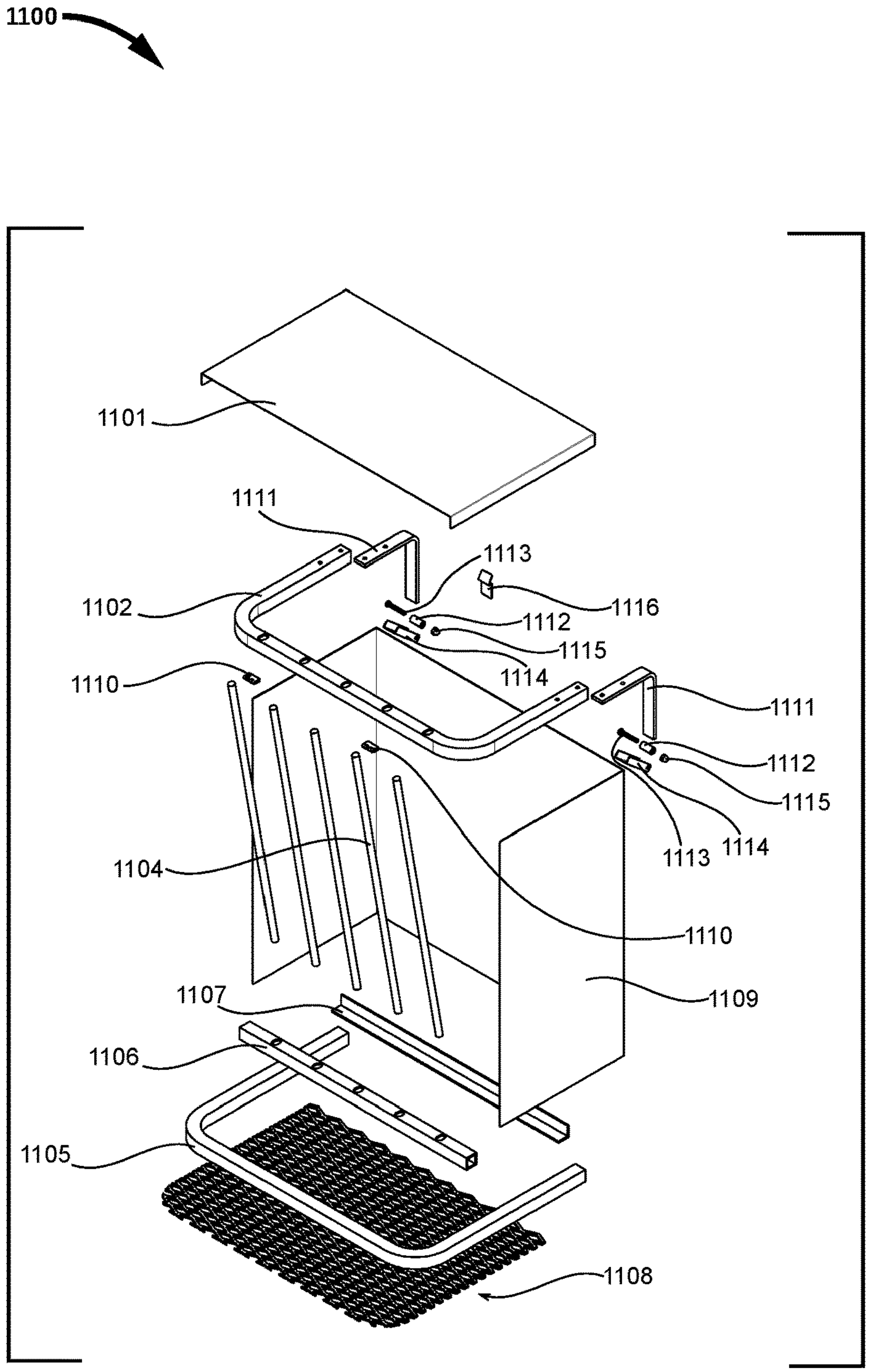

FIG. 11, FIG. 12, and FIG. 13 depict an exemplary roughage feeder (WFSRD 1100). FIG. 11 and FIG. 12 are perspective views of an embodiment of the WFSRD 1100 from the top-left-front corner and the bottom-left-back corner, respectively. FIG. 13 is an exploded perspective view of this embodiment of the WFSRD from the top-left-front corner showing more clearly certain individual components in this embodiment. In this embodiment, a sides-and-back-surface 1109 is coupled (e.g., fixedly coupled) to a top-frame 1102 and a bottom-frame 1105, and is configured as a roughage protection surface (RPS). A top-surface 1101, configured as an RPS, is hingedly coupled by hinges 1110 to a top-frame 1102. The support-member 1107 is attached to the bottom-frame 1105 and the sides-and-back surface 1109. A bottom-piece 1106 is attached to the bottom-frame 1105. Rods 1104 may be inserted through holes shown in top-frame 1102 through top-frame 1102 and into holes shown in bottom-piece 1106. When the top-surface 1101 is closed, it may prevent the rods 1104 from coming back up through holes in top-frame 1102, thereby removably securing rods 1104 and forming a roughage dispensing region (RDR). Rods may be quickly removed (e.g. to free an entrapped animal, to thoroughly clean the WFSRD) by opening top-surface 1101 and pushing rods 104 back through holes in top-frame 1102.

A fenestrated-sheet 1108 is attached to bottom-frame 1105, forming a wastage filtering catchment (WFC). Sides-and-back-surface 1109 and top-surface 1101, together, may, for example, form a suitable RPS to protect roughage on sides, back, and top. Sides-and-back-surface 1109 and top-surface 1101, together with said RDR and said WFC, form a RHR. A user may load the RHR from the top by opening top-surface 1101. Top-surface 1101 is secured closed by latch 1116, which is attached to sides-and-back-surface 1109. Latch 1116 is provided, in the depicted example, with a ramp and a ledge such that when top-surface 1101 is released from a suitable height and swings downward, it falls onto the ramp, pushes latch 1116 away until it closes enough to pass the ramp, at which point the ledge prevents top-surface 1101 from being re-opened unless latch 1116 is pushed backwards enough to allow top-surface 1101 to clear the ledge of latch 1116. An animal may, for example, access the roughage in the RHR from between the rods 1104 forming the RDR.

In the depicted example, an RF assembly is provided comprising hooks 1111, which are affixed to top-frame 1102. The hooks 1111 may, for example, be configured to hang the WFSRD on a surface (e.g., vertical) such as, by way of example and not limitation, a fence, gate, bar, and/or wall. The hooks 1111 may, for example, be affixed to top-frame 1102 by bolts through holes shown in hooks 1111 and top-frame 1102. The holes may, for example, be absent in some implementations. The hooks 1111 may, for example, be affixed by welding. In some embodiments the hooks 1111 may, for example, be removably affixed.

In some variations, hooks 1111 may be replaced by extending the ends of top-frame 1102. Each end may, for example, be formed into a hook (e.g., by bending downward). The hook may, for example, be formed such that a (predetermined) distance is maintained between the hooks thereby formed and the back of sides-and-back-surface 1109.

The RF assembly further includes catches 1114, as depicted. The catches 1114 may operate to releasably couple the WFSRD to a mounting target. Accordingly, the WFSRD may, for example, be advantageously prevented from falling off of a fence, gate, or other mounting surface and/or object by antics of animals. In the depicted example, the catches 1114 are rotatably affixed to hooks 1111. A catch 1114 is rotatably affixed to a hook 1111. For example, a shaft 1113 (e.g., bolt) may be passed through an aperture in one edge of catch 1114 and through a sleeve 1112 coupled to hook 1111 (e.g., integrally formed, welded, bolted, adhered), and through an aperture in an opposite edge of catch 1114. The shaft 1113 may be (releasably) secured by a locking member 1115 (e.g., nut). Various embodiments may include, for example, a gravity-style catch. Various embodiments may include, for example, a spring-style catch (e.g., having one or more urging members). For example, a spring-style catch may be configured as a 'slam latch.'

Various embodiments may advantageously enable dispensing generally fibrous feedstuffs in a manner that may be usable by persons involved in caring for animals, efficient in dispensing roughage, and/or safe for persons and animals interacting with it.

As an illustrative example, a WFSRD may include:

(1) an RHR including at least one RDR and at least one WFC, (2) an RPS substantially covering at least one RHR and configured to be opened by one or more persons to replenish feedstuffs in the covered RHR(s) and to remain closed during normal interaction with an animal (s) being fed while still allowing the animal(s) access to feedstuff in the RHR(s), (3) at least one RF configured to removably affix the(s) in one or more positions.

In some embodiments, a WFSRD may, for example, be configured with characteristics including:

(1) being removably affixed by one or more RFs, (2) spacing of RDR members such that the muzzle of target animals may pass through, while discouraging the entire head from passing through;

(3) spacing of RDR members and WFSRD configuration such that target animals may be discouraged or prevented from passing any body part between said members in one location and being unable to pass said body part back between said members in another location (e.g. as opposed to hay racks and feeders constructed of rods tapered towards each other from top to bottom, creating a 'wedge' shaped opening into which an animal can put a head, hoof, etc at the top of the opening, and then cannot remove it once the head, hoof, etc has fallen down to the bottom of the opening; such a situation may, for example, lead to panic, frantic struggles, and injury or death);

(4) the RDR members may remain in place during expected interaction with target animals, but may be removed by at least one person during normal use; and/or (5) the RDR and WFSRD in general may be configured to prevent animals from passing any body part through consecutive structures and not be able to withdraw the body part.

In some embodiments, various elements may be physically combined, such as described herein.

In various embodiments, a WFSRD may, for example, be provided for use by one or more animals by a human caretaker(s) (or agent(s) thereof). At least one RHR may be loaded from time to time by a human user with (roughage) feedstuffs. The feedstuff may be dispensed as the animals access it through at least one RDR. Wastage of the feedstuff may be at least partially caught by at least one WFC. The at least one WFC may, for example, allow significant moisture (e.g. rain, etc. that may have intruded in some environments and embodiments), smaller particles, powder, etc (which in some cases may be injurious to the health of the animals), to fall through, thereby retaining a higher percentage of edible roughage for the animals to consume—at least some of which may likely have been wasted by the animals during dispensing instead of being consumed.

In some examples, at least one RPS may provide protection to roughage from weather and/or contamination. An RPS may, for example, prevent animals from accessing the roughage via undesired approaches (e.g. potentially dangerous or hazardous to the animals, or potentially allowing higher waste of the roughage).

In some examples, a user may secure the WFSRD in a desired location via at least one RF. The user may, for example, relocate the WFSRD by unsecuring the RF and re-securing in a different location. The WFSRD may, for example, be configured to allow a user to remove at least some components of the RDR (e.g. for cleaning purposes, or to release a stuck animal or object) without permanent damage (e.g., cutting, drilling, tearing) of structural WFSRD components.

In some examples, a roughage holding region (RHR), may, for example, be configured as a receptacle for feedstuffs. The feedstuffs may, for example, include roughage. The RHR may, for example, provide an area for feedstuffs (examples of which are provided in TABLE 1) to be dispensed to one or more animals through one or more RDRs. The RHR may, for example, be protected by at least one RPS.

In some examples, a roughage dispensing region (RDR) may, for example, include a region in the outer (e.g., peripheral) surface of an RHR for dispensing the feedstuffs in the RHR to one or more animals. In various embodiments, an RDR may cover any portion of the outer surface of an RHR. The RHR may be substantially covered above by one or more RPS. In some embodiments, an RDR may, for example, (only) provide access to one side or (small) segment of an RHR. In some embodiments, RHRs may be contiguous across multiple RDRs, for example, such that multiple RHRs appear to be a single RHR providing access to feedstuffs in multiple RDRs.

In some examples, a wastage filtering catchment (WFC), may, for example, be disposed at least partially beneath at least one RHR. A WFC may, for example, serve to catch feedstuffs dropped by an animal(s) while eating from a WFSRD. A WFC may, for example, serve to allow moisture and fine waste (see, for example, TABLE 2 including exemplary types of fines, depending on filter size [s]) to shed from the roughage, including the caught wastage. Accordingly, quality of the roughage may be advantageously preserved (e.g., longer than if moisture was allowed to accumulate). Dust and other fine waste that may be in the roughage may be advantageously filtered out of the roughage instead of into the animal's face. Illustrative WFC materials are listed, by way of example and not limitation, in TABLE 2.

In some examples, a roughage protection surface (RPS), may, for example, include a surface suitable for protecting roughage in one or more RHR. In embodiments optimized for exterior applications and specifially optimized for protecting roughage from weather, an RPS may include a solid (e.g., continous, uninterrupted) surface. The RPS may, for example, be at least partially semi-rigid. The RPS may, for example, be at least partially rigid. In embodiments optimized for interior applications, an RPS may, for example, include a fenestrated surface. The fenestrated surface may, for example, prevent the animal(s) intended to be eating from a given WFSRD from accessing the RHR in at least one particular manner or location, prevent other animal(s) from accessing the RHR, or some combination thereof.

A single WFSRD may, for example, contain one or more RPS. TABLE 3 contains exemplary RPS materials, protection capabilities, and applications.

In some examples, a relocatable fixator (RF), may include one or more components configured to permit a WFSRD to be affixed in a location for use by one or more animals. The RF may, for example, further be configured to permit the WFSRD to be relocated without inherent destruction of, or substantially total disassembly of, the WFSRD. "Relocatable" may, for example, not refer to relocation of the RF in relation to the WFSRD, but relocation of the WFSRD permitted by the RF. In some embodiments, a WFSRD may have one or more RFs. For example, in such embodiments, some of the RFs may be integrated into at least one other component of the WFSRD (e.g. holes in one or more components of the WFSRD, a hook integral to a frame member).

In some embodiments, a WFSRD may, for example, have one or more RFs. In some examples, at least some of the RFs may include separate components (e.g., a hook which may be attached to a frame member via bolts, an integral locking mechanism, carabiner-type clips that allow the WFSRD to be hung from eye-bolts). In some embodiments, the WFSRD may, for example, be provided with interchangeable and/or reconfigurable RFs, such as to provide for different methods of fixation. Fixation may, by way of example and not limitation, involve screwing, bolting, and/or otherwising affixing to the wall, hanging from a fence and/or cross-member, or other mounting structure. TABLE 4 discloses, by way of example and not limitation, illustrative RFs, including components and uses.

In regards to various embodiment described herein, 'animal' may be used in the singular to represent one or more animals which may access a given WFSRD. Unless otherwise specifically limited to only a single animal, 'animal' refers to at least one, but potentially multiple, animals. In particular examples or descriptions, 'animal' may be used where a single animal would access (e.g., as intended by a user/installer) a given WFSRD (or portion thereof) at a given point in time, but the WFSRD (or portion thereof) may, notwithstanding, unless otherwise specified, service multiple animals that are in a single pen, pasture, or other area.

'Feedstuff' and 'feedstuffs' may, for example, refer to material normally used to provide nutrition to animals. Feedstuffs may, by way of example and not limitation, include minerals, concentrates, roughage, or some combination thereof.

'Roughage' may, for example, include generally fibrous feedstuffs. Roughage may be used to provide nutrition to animals. Roughage may, for example, include plant material. Roughage may, by way of example and not limitation, be important to browsing and/or grazing animals, including ruminants and equids. Roughage may, for example, include hay (e.g., dried leaves, potentially including stalks and/or roots, of grasses, legumes, and the like). Roughage may, for example, include 'browse' (e.g., leaves and smaller stalks, twigs, and branches of brushy-type plants—trees, bushes, and 'tougher' plants).

'Wastage' may, for example, refer to feedstuffs (e.g., roughage) taken from a feeder by an animal but not consumed (at least initially). For example, cattle, goats, equines, and/or other animals may take a mouthful of hay from a dispenser and drop a significant portion of the mouthful during chewing. Once feedstuffs are dropped onto the ground, they may be trampled, contaminated, and/or otherwise rendered unfit for consumption. Various embodiments may advantageously catch at least some wastage before it is contaminated and/or trampled, for example. Accordingly, various embodiments may advantageously preserve for consumption feedstuffs that would otherwise be wasted.

In some examples, 'Expected interaction' and 'normal use' may refer to interaction reasonably expected from creatures intended to be interacting with a WFSRD. Expected interaction may refer to a human user, an animal using the WFSRD, or both. Expected interaction may, for example, include a human user's movement of a WFSRD, affixing or unaffixing a WFSRD, filling a WFSRD with feedstuff, removing waste from a WFSRD, and/or cleaning/ maintenance of a WFSRD.

Normal use and expected interaction may, for example, refer to expected interaction within the context of dispensing feedstuffs to animals, and may vary somewhat according to particulars of the embodiment and environment. For example, normal use for a single-animal WFSRD to be hung on an approximately 3-6 foot high exterior (e.g., exterior to the animal enclosure, accessible by a human from the outside) fence may include filling an RHR from the outside. For a WFSRD with hooks and catches, expected interaction of a human may, for example, further include disengaging catches and/or removing the WFSRD (e.g., from a fence, wall) in order to clean, move, and/or otherwise interact with it. For a WFSRD bolted to a solid wall (e.g., on a flat wall, in a corner), normal interaction may include filling a RHR from an inside of the enclosure, from an outside through an access provided in the wall, and/or from an outside over the wall if the wall is short enough.

Expected interaction of an animal(s) may, for example, include eating feedstuff from a WFSRD. Expected interaction may include normal feeding behavior, antics, and/or investigation of a given animal or species. For example, normal interaction of a caprine may include feeding behavior such as jumping and standing on some portion of a WFSRD. Normal interaction may include head scratching, mouthing, and/or other investigation, exploration, and/or other antics. Expected interaction for bovines and equines may include similar behaviors appropriate thereto.

Expected interaction may not encompass use by a group of animals for which a particular embodiment is not intended. In some examples, expected interaction with a WFSRD adapted for caprines may not include interaction with the WFSRD by domestic, wild, or feral avians, swine, canines, equines, and/or bovines. However, expected interaction for some embodiments adapted for general domestic livestock use may, for example, include bovines, equines, caprines, and/or other domestic livestock.

In various embodiments, such as those described in relation to FIGS. 11-13, the WFSRD may be configured to provide roughage to a single animal. A WFSRD may, for example, be configured to provide roughage at least to a single animal at one time. In some embodiments, the WFSRD may be configured to provide roughage to multiple animals. Various such configurations may include any combination of enlarged RDR, multiple RDR, RDR on opposing sides, multiple angles of approach to one or more RDR, or some combination thereof.

In some embodiments, a WFSRD such as in FIGS. 11-13 may be 'doubled' with a shared back surface, such that two RDR are available. In some embodiments, the WFSRD may be doubled, with dual back surfaces separated by a space such that the WFSRD may be hung over a (substantially) vertical mounting structure (e.g., a fence), such as in a 'saddlebag-style' mounting configuration. In some embodiments, the WFSRD may be doubled and may be hung over a fence, wall, or other (substantially) vertical mounting structure, but may, for example, have no (interior) back surfaces. For example, the vertical mounting structure may serve as a divider, making up part of one or more RHRs.

In some embodiments, a WFSRD may be configured as an accessory for a TRMC (e.g., for panel 105, panel 715, panel 710). For example, the top-frame 1102 and/or the bottom-frame 1105 may extend beyond the sides-and-back 1109. An aperture (e.g., such as depicted at least with reference to aperture 130 of coupling member 120 in FIG. 1) at a distal end of each extending frame member may be configured to receive a barrier member (e.g., barrier member 115) therethrough. The width of the top-frame 102 and the bottom-frame 1105 may, for example, be determined based on D1 such that the apertures in distal ends of the left and right sides of each of the top-frame 1102 and the bottom-frame 1105, for example, may be brought into register with apertures 125 in the frame members (e.g., 106A, 106B) in the barrier panel 105. Accordingly, the WFSRD may advantageously, for example, be releasably and tool-lessly coupled to a panel (e.g., the barrier panel 105). For example, such a WFSRD may be an 'integratable' accessory to a panel (e.g., the barrier panel 105).

In some such embodiments, the hooks 1111 and/or the catches 1114 may be omitted. In some embodiments configured to couple as an integrated accessory to a panel, a back portion of the sides-and-back 1109 may, for example, be omitted. In such embodiments, for example, the barrier members 115 may act as a back RDR.

In various embodiments, such as those with multiple RDRs, it may be important that an RDR is configured such that an animal cannot easily become stuck by passing a body part in through a portion of one RDR and out through a portion of another. For example, in some embodiments, a WFSRD such as shown in FIGS. 1-3 may be provided with RDR on one or both sides. Some such embodiments may, for example, be provided with a baffle in the RHR. Some embodiments may, for example, include at least one region between the front and side RDRs, the region being sufficiently solid (e.g., continuous, uninterrupted/non-fenestrated) such that intrusion of a limb, head, and/or other body portion of an intended animal may be prevented from entering. For example, various such embodiments may advantageously prevent entrapment of (intended) animals.

In some examples, without such protection, an animal may become entrapped by, for example, in a WFSRD such as in FIGS. 11-13, but provided with an additional RHR on one side. Such entrapment may occur, for example, when an animal (particularly a young animal) jumps up on the front RHR, slips a leg between the rods and then, turns such that the leg slips through the side RHR. Such a situation may, for example, be more prone to happen when closely spaced horizontals (such as in welded wire livestock fencing panels) are used—even with only one RHR—because an animal can jump up on the RHR, a foot slips through one aperture (e.g. an approximately 4 in×4 in opening), then slips back out through another aperture, effectively pinning the leg in place and trapping the animal up in the air. The animal may now be helpless, and liable to self-inflicted injury in trying to escape, to injury from exposure, injury from other animals, or some combination thereof. Accordingly various embodiments may be provided with horizontals (e.g., rods) spaced and/or apertures of sufficiently restrictive geometry to prevent insertion of an undesired body portion. Various embodiments may, for example, be provided with a single RDR presented to a given set of animals. Various embodiments may, for example, provide baffles and/or sufficient space between adjacent RDRs to prevent access to both RDRs by a given animal at one time (e.g., a separate width greater than a width, height, length, and/or leg spacing of an intended animal). Accordingly, various embodiments may advantageously prevent entrapment.

Some embodiments may be particularly adapted to one or more species. For example, an illustrative embodiment adapted to caprines and/or ovines may be provided with spacing between vertical components of the RHR of approximately 2-5 inches. Some such embodiments may, for example, have spacing of 3-3.5 inches. An illustrative embodiment adapted for cattle may, for example, be provided with vertical spacing of approximately 3-10 inches.

In various embodiments, by way of example and not limitation, a spacing between vertical components may be at least a width of a muzzle of an intended animal. The width may, for example, be wider than the muzzle by a (predetermined) tolerance. The width may, for example, be less than a maximum width of a head of the intended animal. The width may, for example, be less than a width between the eyes.

Various embodiments may, for example, be advantageously adapted to different ages of a given one or more species. For example, an embodiment for young dairy calves may be provided with closer spacing than an embodiment for mature beef cattle.

Some embodiments are particularly adapted for animals with horns, employing similar principles as discussed herein relating to entrapment, etc., but applying the principles to the added dangers of horn entrapment. For example, some such embodiments provide a single access opening into a single RDR such that the animal can not thread a horn between rods.

Some embodiments may be particularly adapted for particular feedstuffs and/or types of feedstuffs. For example, in some embodiments adapted for feeding browse, the RDR spacing may be configured as large as possible while still retaining safety characteristics, in order to allow chewing and pulling through of light branches and twigs. Some embodiments adapted for branches may, for example, have a long, relatively narrow area for larger branches. An RPS may include an extended roof. A WFC may include an extended, fenestrated, lower platform. Accordingly, smaller twigs and leaves may be advantageously allowed to protrude through the RDR, thereby providing easy access to the most palatable areas, while still protecting the feedstuff and/or catching at least some of the wastage.

Some embodiments may, for example, be adapted to fruits. Such embodiments may, by way of example and not limitation, have generally circular and/or semi-circular openings (still configured to prevent entry of the whole head) to permit better access to biting the fruit. Such openings may be sufficiently small and/or spaced apart sufficiently to prevent both complete removal of the fruit before it is significantly consumed and entrapment as discussed elsewhere herein.

Some embodiments may, for example, be provided in different configurations. In some embodiments, an RDR may, for example, be substantially straight. In embodiments such as illustrated in FIGS. 11-13, the WFSRD may be rectangular in shape, with a substantially straight RDR across the front.

In another such embodiment, the WFSRD may be adapted to fit into a corner. Such an embodiment may have a substantially triangular shape, with a RDR across the front. In some such embodiments, the WFSRD may have a generally triangular top and bottom profile, but rectangular side profiles. In other such embodiments, the WFSRD is triangular on top and sides. In some such embodiments, the RDR may be straight. In some embodiments the RDR may be curved (convex or concave). In some embodiments the RDR may, for example, be provided with a (compound) curvilinear profile. Curved shapes (convex in relation to a RHR) of an RDR may, for example, advantageously provide more surface area, and thereby more access to roughage for one or more animals. Accordingly embodiments with curved RDRs may, for example, advantageously economically provide a required and/or recommended area of roughage access per animal.

In various embodiments, downward-pointing wedge-shaped fenestrations may be substantially avoided and/or omitted. For example, downward-pointing wedge-shaped fenestrations may be particularly liable to entrapping animals. For example, even in a triangular RDR comprising rods, where the RDR is pointed at the bottom, the rods may, for example, be substantially parallel to each other. The bottom triangle may, for example, be formed by the rods terminating at different lengths. For example, the rods may not incline towards one another.

Various embodiments, such as is shown in FIGS. 11-13, may, for example, employ a semi-monocoque structure. For example, at least some of the RPS may provide at least some of the framing of the WFSRD. Some embodiments may, for example, employ a full-monocoque structure. Some embodiments may, for example, employ a non-monocoque structure.

In some embodiments, the RDR may include vertical members (e.g., rods), such as shown in FIGS. 1-3. In some such embodiments, the vertical members may, for example, be semi-rigid. For example, the vertical members may be configured with a (predetermined) yield point (e.g., at which bending occurs) and/or modulus (e.g., Young's modulus) that an (intended) animal, in the case of entrapment despite preventions disclosed herein, may free itself by pulling hard enough. For example, the vertical members may advantageously bend, deform, break, and/or otherwise give way, as provided in the embodiment and consistent with continued safety of the animal. As an exemplary illustration, PVC pipe of approximately ½-1½ inch diameter may be used for caprines. As an exemplary illustration, PVC pipe of approximately ¾-2 inch diameter may, for example, be used for equines. Such embodiments may provide semi-rigid vertical members configured to yield to a panicked (e.g., trapped) animal. Mild (typical structural) steel, or tempered steel with sufficient elasticity and/or sufficiently low strength may, for example, be provided in some embodiments. Aluminum vertical members may, for example, be provided in some embodiments. In an exemplary illustration, solid mild steel and/or aluminum (e.g., 6061) rods (e.g., with a substantially circular cross-section) of approximately ½ inch diameter, similar to those shown in FIGS. 11-13, may be implemented. Such embodiments may, by way of example and not limitation, be advantageously employed for caprines, equines, ovines, and/or at least some bovines.

Although various embodiments have been disclosed with reference to the figures, other embodiments are possible. For example, modern animal husbandry frequently involves controlled and/or free-choice dispensing of roughage to one or more animals. Various embodiments may, for example, advantageously provide feedstuff dispensers adapted to dispense one or more types of roughage to one or more animals. Various embodiments may, for example, provide feedstuff dispensers easy to use by the animal husbandmen. Various embodiments may, for example, provide feedstuff dispensers safe for intended animals and/or for the husbandmen. Various embodiments may, for example, provide apparatus and/or methods for dispensing roughage in a manner that is usable by persons involved in caring for animals, efficient in dispensing roughage, and/or safe for persons and animals interacting with it.

In various embodiments feeders may, for example, hang on a wall or fence. Some feeders may, for example, be designed for use inside of an animal shelter. Some feeders may, for example, be freestanding and/or may be designed for use inside a shelter or out of doors, in a pen, or in a pasture. Various embodiments may provide dispensers which may be used without requiring constant supervision. Some embodiments may provide advantages over equine feeding nets, which may risk entrapment, entanglement, and/or hanging hazards and/or may be be difficult to load.

Various embodiments may advantageously provide protection of the feedstuff from the weather in an outdoor environment, while maintaining ease of refilling in spite of the weather protection feature(s). Various embodiments may provide lids, doors, and/or other closure panels which may be resistant to inadvertent operation when played with by curious and/or bored animals. Accordingly various embodiments may prevent endangering of animal(s), prevent negating of weather protection, and/or prevent unwanted access to feedstuffs. Such embodiments may, for example, thereby reduce wastage (e.g., due to unwanted exposure of feedstuffs) and/or may be increase the expected lifespan of the feeder. Various embodiments may provide for catchment of wastage as animals eat, thereby reducing and/or eliminating wasted feedstuff (e.g., below the feeder). Accordingly various such embodiments may prevent health and/or safety hazards, prevent the need for frequent removal, and/or decrease the cost of feeding the animal(s).

In an illustrative aspect, a WFSRD may be configured suitably to dispense generally fibrous feedstuffs to at least one animal. The WFSRD may include (a) at least one RHR including (i) at least one RDR and (ii) at least one WFC, (b) at least one RPS substantially covering the top of said at least one RHR and configured to be opened by at least one person for replenishment of feedstuffs in RHR, and to remain closed during normal interaction with said at least one animal while still allowing said at least one animal access to said at least one RHR, and (c) at least one RF configured to removably affix said WFSRD in at least one desired position. The RDR may include multiple members spaced substantially parallel to one another with sufficient space between said members to allow muzzle of said at least one animal to fit between them, while being spaced sufficiently close to one another to discourage entire head of said at least one animal from passing between them. The spacing between said members may be sufficiently uniform to prevent said at least one animal from passing any body part between said members in one location and being unable to pass said body part back between said members in another location. The members may be removably secured such that they remain secured in place during expected interaction with said WFSRD by said at least one animal, but may be removed by at least one person during normal use. The RDR may be further configured such that said at least one animal is prevented from passing any body part through consecutive portions of said at least one RDR and thence being prevented from withdrawing said body part.

The members of the RDR may be substantially vertical, when viewed from a front of the WFSRD. The RDR may be further configured such that any support members supporting, connecting, or crossing said substantially vertical members are configured to prevent said at least one animal from entrapping a body part. The WFSRD may be provided with a semi-monocoque structure. The WFSRD may be adapted to at least one of: caprines, ovines, equines, or bovines. The said members of said RDR may be circular in cross-section with diameter of ⅜ to 1½ inches. Said members may be solid, and may have a diameter of about ½ inch. The RPS may include a single sheet forming a back and a left and right side. The RPS may include a single sheet forming a top, the top being hinged to provide access to the RHR by a human user upon release of a latch. The latch may be configured to automatically catch when a user drops the top from an open position, the top automatically being urged to a closed position by at least one means selected by at least one of: gravity, an integrated spring, a separate spring, an electric actuator, hydraulic motive, and pneumatic motive. The WFC may include a fenestrated bottom, the expanded metal openings being approximately ¼ to 2 inches wide in one direction. The RF may include at least one hook provided with a catch, wherein the catch is urged into a caught position by at least one of: gravity, an integrated spring, a separate spring, an electric actuator, hydraulic motive, and pneumatic motive; wherein the catch is configured to prevent defixing of the WFSRD, unless the catch is moved out of the caught position, from at least one substantially horizontal member selected from: dimensional 2×4 lumber, a solid or hollow cylinder of generally circular cross-section of 3 inch diameter or less, 2⅜ inch diameter steel pipe, angle iron of 3 inch width or less, and rectangular tubing of 3 inch width or less.

In an illustrative aspect, a safety barrier may include a first barrier panel. The first barrier panel may include a first rail extending along a first longitudinal axis and including a first set of apertures spatially distributed along the first longitudinal axis. Each aperture may extend entirely through the first rail. The safety barrier may include a second rail may extend along a second longitudinal axis. The second rail may include a second set of apertures spatially distributed along the second longitudinal axis. The safety barrier may include a set of barrier members, each barrier member extending along a corresponding longitudinal axis. The safety barrier may include at least two longitudinally extending frame members, each having a proximal end configured to be coupled to a corresponding end of the first rail and a distal end configured to be coupled to a corresponding end of the second rail.

When the at least two frame members are coupled to opposing ends of the first rail and second rail such that the first longitudinal axis and the second longitudinal axis are substantially parallel and spaced apart, and each of the set of barrier members are disposed through one of the first set of apertures and into a corresponding one of the second set of apertures, and are spatially distributed along the first longitudinal axis and the second longitudinal axis to form a barrier, then the set of barrier members may, for example, be individually releasable from the first rail and the second rail without tools by withdrawing a selected barrier member through the corresponding aperture in the first set of apertures until the selected barrier member is released from the corresponding aperture in the second set of apertures.

The safety barrier may include a longitudinally extending closure member configured to be releasably coupled to the first rail in a locked mode obstructing the first set of apertures, and further configured to be operated into an unlocked mode not obstructing the first set of apertures such that, when the closure member is operated into the locked mode, then the set of barrier members are releasably captured between the first rail and the second rail.

The closure member may be hingedly coupled to the first rail.

The safety barrier may include a coupling member having a first coupling aperture at a first end and a second coupling aperture at a second end configured such that: when the coupling member is brought into register with the first barrier panel and at least one of the set of barrier members are operated through the corresponding aperture of the first set of apertures in the first rail, through the first coupling aperture of the coupling member, and into a corresponding aperture of the second set of apertures in the second rail, and a barrier member of a second barrier panel is operated through a third rail of the second barrier panel, through the second coupling aperture of the coupling member, and into a fourth rail of the second barrier panel, then the first barrier panel and the second barrier panel may be releasably coupled together.

At least one of: the first rail, and the second rail, may include a hollow cross-section such that each rail defines a lumen extending from a distal end to a proximal end of the rail.

At least one of: the first rail, and the second rail, may be configured to receive a coupling member into the lumen such that, when a coupling aperture through the coupling member is operated into register with at least one aperture of the first set of apertures and the second set of apertures, and a locking barrier member of the set of barrier members is operated through the first rail and into the second rail, including through the at least one aperture and through the coupling aperture, then the locking barrier member may releasably couple the first barrier panel to the coupling member.

At least one of the frame members may be fixedly coupled to the coupling member.

The safety barrier may include a third rail extending along a third longitudinal axis, the third rail comprising a third set of apertures spatially distributed along the third longitudinal axis. The third rail may be configured to be disposed between the first rail and the second rail with the set of barrier members disposed through corresponding apertures of the third set of apertures.

The safety barrier may include a gate panel having a set of coupling members extending from at least one side. The coupling members may be configured to couple to the first rail and the second rail, respectively, of the barrier panel.

The safety barrier may include a gate hingedly and releasably coupled to the gate panel by a removable barrier member extending through at least two apertures in the gate panel and at least one aperture in the gate.

The gate may include a top rail having a third set of apertures extending through the entire top rail. The gate may include a lower rail having a fourth set of apertures extending into the lower rail. The gate may include a set of gate barrier members individually releasably coupled to the gate when disposed through respective apertures of the third set of apertures and disposed in respective apertures of the fourth set of apertures.

The safety barrier may include an accessory having at least a first aperture such that, when a barrier member of the set of barrier members is passed through the first aperture and disposed in the first rail and the second rail, then the accessory is releasably coupled to the barrier panel. The accessory comprises a hay rack.

The safety barrier may include a roughage feeder. The roughage feeder may include an upper frame member having an array of apertures extending through the upper frame member. The roughage feeder may include a lower frame member having an array of apertures extending into the lower frame member. The roughage feeder may include a set of feeder barrier members configured to be individually and releasably coupled to the upper frame member and the lower frame member when each feeder barrier member is disposed through a corresponding aperture of the array of apertures in the upper frame member and into a corresponding aperture of the array of apertures in the lower frame member. The roughage feeder may include at least one substantially solid side panel. The roughage feeder may include a fenestrated panel coupled to the lower frame member. The roughage feeder may include a substantially solid cover hingedly coupled to the upper frame member. The upper frame member and the lower frame members, the at least one substantially solid side panel, the fenestrated panel, and the cover may, for example, cooperate to form a cavity configured to receive roughage. The cover may be configured to be operated to selectively provide access into the cavity. The fenestrated panel may be configured to allow particles smaller than a fenestration size to drop out of the cavity while preventing loss of roughage larger than the fenestration size. The set of feeder barrier members may be spaced to allow a nose of a target animal to enter the cavity while preventing the target animal from protruding their entire head into the cavity.

The various embodiments, examples, and illustrations disclosed herein, while representing various modes, including the best known mode(s) as currently contemplated, are not intended to be limiting or exhaustive, but serve as an aid to comprehending the full nature and scope. Various other embodiments may fall within the scope of this disclosure. For example, variations may be advantageously made in the order of steps, the arrangement of components, the replacement of components, removal of components, addition of components, or some combination thereof. These and other variations and modifications of the embodiments disclosed herein, including alternatives and equivalents of the various elements of the embodiments, may be made without departing from the spirit and scope. Accordingly, other implementations are contemplated within the scope of the following claims.

TABLE 1

Example Roughage Feedstuffs Potentially Provided in a WFSRD

| Feedstuff | Type | Example Animals* |
|---|---|---|
| Grass Hay | Hay | Bovines, Caprine, Ovines, |
| Kentucky Bluegrass Hay | | Equines, Camelids |
| Bluestem hay | | |
| Bermuda Grass Hay | | |
| Timothy Grass Hay | | |
| Coastal, Jiggs, or Tifton Bermuda Hay | | |
| Oats, with or without seedhead | | |
| Wheat, with or without seedhead | | |
| Barley, with or without seedhead | | |
| Corn | | |
| Alfalfa (legume) Hay | Hay | Equines, Caprines, Giraffes |
| Yaupon Holly, fresh branches | Browse | Caprines, Equines, Bovines |
| Silage | Fermented | Bovines, Caprines, Ovines, |
| Haylage | Roughage | Swine |
| Oatlage | | |
| Sorghum silage | | |
| Fresh Grass, Legumes, etc | Fresh Grass | Bovines, Caprine, Ovines, |
| (such as in hay, herein, but fresh) | | Equines, Camelids |
| Sorgham Hay (technically a grass, but | Hay | |
| often referred to as a separate class) | | |
| Sudan grass | | |
| Millet | | |
| Milo | | |
| Eucalyptus leaves | Browse | Koalas |
| Waste vegetables | | Swine, Bovines |
| Fruit | | |
| Acacia leaves | | |

*Example animals are examples only. Other listed and non-listed animals may, for example, be fed various feedstuffs on this list and/or feedstuffs not on this list, but nevertheless suitable for use in a WFSRD.

TABLE 2

Example Types of Fines Potentially Filtered by a WFC

| Roughage - Fines | Example WFC Material(s)[1][2] |
|---|---|
| Grass, fresh and hay - small | Expanded metal (width across diamond |
| (approx. <1 inch long) grass | approximately ¼-8 inches, depending on |
| pieces, dust, bark bits, root | species) |
| pieces, dirt clods | Rods or other members, parallel, or crossed, |

TABLE 2-continued

| Example Types of Fines Potentially Filtered by a WFC | |
|---|---|
| Roughage - Fines | Example WFC Material(s)[1][2] |
| Fruit and vegetables - waste pieces and debris | approximately ¼-8 inches apart in at least one direction |
| Alfalfa, fresh and hay* - dust, etc. | Welded wire livestock panels |
| Branches - dust, twig bits, bark, etc. | Punched metal, ¼-8 inch openings |
| Larger leaves - dust, twigs, bark, etc. | * In some embodiments, expanded metal of <1 in, and preferably about ½ inch, width across the diamond (or another solution with similar spacings), is provided for alfalfa hay in order to minimize discarding of nutrient-dense leaves, which are shaken out easily of many alfalfa hays. |
| Silage | Expanded metal, <1 inch |
| Mashed fruit and vegetables - bits & juice | Rods, spaced less than <1 inch apart in at least one dimension |
| Small branches with small leaves - dust, etc. | Punched metal with opening less than <1 inch<br>Hardware cloth, openings <1 inch |
| Small leaves - dust, etc. | Screen, openings <1 inch |
| Hay, etc with grain or seedheads - dust, etc. | |

[1]WFC fenestration sizes may, for example, be understood to be bounded by a maximum size to prevent entrapment, unless animals have no access to the applicable portion of the WFC. Maximum size to prevent entrapment may vary, depending on the application. For example, in many cases maximum size to prevent entrapment in a WFC may be approximately slightly smaller than the smallest diameter of a hoof or foot of an animal reasonably expected to use the WFSRD. Other sizes to prevent entrapment (e.g., other than the WFC may be the same, larger, or smaller than the WFC maximum size to prevent entrapment).

[2]Examples are illustrative of some embodiments only, and non-limiting. Specific situations may, for example, call for particular embodiments, which may or may not be within the example ranges presented in this table, but will be within the scope of the disclosure and claims. Furthermore, actual materials used may, for example, include metal (e.g. aluminum, steel, etc., including coated metal, e.g. painted, powder-coated, e-coated, galvanized). Materials may include, for example, plastic (including, e.g. UV-treated plastic). Materials may include, for example, composite (e.g. fiberglass, carbon fiber). Materials may, for example, include wood.

TABLE 3

| Example RPS Materials & Configurations | | |
|---|---|---|
| Configuration | Example Applications | Example Materials |
| Flat front with vertical parallel rods, ~2-5 in. spacing | Single-animal or multi-animal WFSRD<br>Caprines, Ovines | Steel rods<br>Aluminum rods<br>PVC and/or metal pipe<br>Fiberglass and/or carbon fiber rods and/or tubing<br>Wood dowels |
| Flat front with vertical parallel rods, ~3-6 in. spacing | Equines | Materials, as above |
| Flat front with vertical parallel rods, ~2-8 in. spacing | Bovines (smaller spacings allow access with tongues - as in grazing - only) | Materials, as above |
| Curved front, vertical parallel rods | Multiple-animal, single-animal, corner, etc.<br>Various species, depending on spacing | Materials, as above |
| Vertical members with horizontal supports (spaced to avoid entrapment) | Extended height for multiple animals (e.g. mature and young animals)<br>Extended lenth for multiple animals | Materials, as above |
| Punched sheet | Various species<br>Various sizes<br>Allows access in discrete locations<br>Better weather protection | Metal (e.g. stainless, galvanized, painted, uncoated, etc.)<br>Plastic<br>Composite (e.g. fiberglass)<br>Wood |

TABLE 4

| Example RFs | | |
|---|---|---|
| RF | Example Components | Example Applications |
| Holes + Fastener | Bolt(s) & nut(s), screw(s), etc. Hole(s) in some portion of WFSRD | Screw, bolt, or otherwise fasten a WFSRD to a wall, fence, pole, or other structure |
| Loop + Stake | Loop(s) or hole(s) in some portion of WFSRD Stake(s) | Stake a WFSRD to the ground |
| Integrated Hook | Hook(s) integral to a portion(s) of the WFSRD | Hang the WFSRD on a wall, fence, pole, beam, etc. |
| Separate Hook | Hook(s) attached to a portion(s) of the WFSRD Latch (integral or separate) | Hang the WFSRD on a wall, fence, pole, beam, etc. Latch prevents it from being knocked off by animal |
| Extending Members | Members (e.g., frame members) extending out of back, with apertures therein | Hang the WFSRD as an accessory on a TRMC, such as by releasably coupling the WFSRD to the TRMC via a barrier member (e.g., rod) |

NOTE:
Various RFs may, for example, be combined in some embodiments. For example, a hook may also have holes provided such that it may be hung on a fence, board, etc, or screwed to a wall, etc. In some embodiments, a hook (or other RF) may be reconfigurable - for example, a hook turned downward to act as a hook to hang upon a fence, or turned upward to be bolted or screwed to a wall, etc. A hook(s), for example, may provided in some embodiments which may be reconfigured to extend inward or outward to adjust to hanging on different size members (e.g. 2 × 4 lumber, 4 × 4 lumber, 2⅞ in. pipe, etc.)

The invention claimed is:

1. A safety barrier comprising a first barrier panel, the first barrier panel comprising:

a first rail extending along a first longitudinal axis and comprising a first plurality of apertures spatially distributed along the first longitudinal axis, each aperture extending entirely through the first rail;

a second rail extending along a second longitudinal axis and comprising a second plurality of apertures spatially distributed along the second longitudinal axis;

a plurality of barrier members, each barrier member extending along a corresponding longitudinal axis;

at least two longitudinally extending frame members, each having a proximal end configured to be coupled to a corresponding end of the first rail and a distal end configured to be coupled to a corresponding end of the second rail; and, a longitudinally extending closure member selectively operable between a locked mode, in which the closure member is releasably coupled to the first rail such that the closure member is obstructing the first plurality of apertures, and an unlocked mode such that the closure member is not obstructing the first plurality of apertures, wherein:

when the at least two frame members are coupled to opposing ends of the second rail such that the first longitudinal axis and the second longitudinal axis are substantially parallel and spaced apart, and each of the plurality of barrier members are disposed through one of the first plurality of apertures and into a corresponding one of the second plurality of apertures, and the closure member is operated into the locked mode, then the plurality of barrier members are releasably captured between the first rail and the second rail and are spatially distributed along the first longitudinal axis and the second longitudinal axis to form a barrier, and when the closure member is operated from the locked mode into the unlocked mode, then the plurality of barrier members are individually free to withdraw from the first rail and the second rail without tools at least by withdrawing a selected barrier member through the corresponding aperture in the first plurality of apertures until the selected barrier member is released from the corresponding aperture in the second plurality of apertures.

2. The safety barrier of claim 1, further comprising a coupling member having a first coupling aperture at a first end and a second coupling aperture at a second end configured such that:

when the coupling member is brought into register with the first barrier panel and at least one of the plurality of barrier members are operated through the corresponding aperture of the first plurality of apertures in the first rail, through the first coupling aperture of the coupling member, and into a corresponding aperture of the second plurality of apertures in the second rail, and a barrier member of a second barrier panel is operated through a third rail of the second barrier panel, through the second coupling aperture of the coupling member, and into a fourth rail of the second barrier panel, then the first barrier panel and the second barrier panel are releasably coupled together.

3. The safety barrier of claim 1, wherein:

at least one of: the first rail, and the second rail, comprises a hollow cross-section defining at least one lumen extending from a distal end and from a proximal end of the rail, such that the rail is configured to receive a coupling member into the at least one lumen such that, when a coupling aperture through the coupling member is operated into register with at least one aperture of the first plurality of apertures and the second plurality of apertures, and at least one locking barrier member of the plurality of barrier members is operated through the first rail and into the second rail, including through the at least one aperture and through the coupling aperture, then the at least one locking barrier member releasably couples the first barrier panel to the coupling member.

4. The safety barrier of claim 3, wherein at least one of the frame members is fixedly coupled to the coupling member.

5. The safety barrier of claim 1, further comprising a third rail extending along a third longitudinal axis, the third rail comprising a third plurality of apertures spatially distributed along the third longitudinal axis, wherein the third rail is configured to be disposed between the first rail and the second rail with the plurality of barrier members disposed through corresponding apertures of the third plurality of apertures.

6. The safety barrier of claim 1, further comprising:

a gate panel having a plurality of coupling members extending from at least one side, the coupling members configured to couple to the first rail and the second rail, respectively, of the first barrier panel; and a gate hingedly and releasably coupled to the gate panel by a removable barrier member extending through at least two apertures in the gate panel and at least one aperture in the gate, the gate comprising:

a top rail having a third plurality of apertures extending through the entire top rail;

a lower rail having a fourth plurality of apertures extending into the lower rail; and, a plurality of gate barrier members individually releasably coupled to the gate when disposed through respective apertures of the third plurality of apertures and disposed in respective apertures of the fourth plurality of apertures.

7. A safety barrier comprising a first barrier panel, the first barrier panel comprising:

a first rail extending along a first longitudinal axis and comprising a first plurality of apertures spatially distributed along the first longitudinal axis, each aperture extending entirely through the first rail;

a second rail extending along a second longitudinal axis and comprising a second plurality of apertures spatially distributed along the second longitudinal axis;

a plurality of barrier members, each barrier member extending along a corresponding longitudinal axis; and at least two longitudinally extending frame members, each having a proximal end configured to be coupled to a corresponding end of the first rail and a distal end configured to be coupled to a corresponding end of the second rail, wherein:

when the at least two frame members are coupled to opposing ends of the first rail and second rail such that the first longitudinal axis and the second longitudinal axis are substantially parallel and spaced apart, and each of the plurality of barrier members are disposed through one of the first plurality of apertures and into a corresponding one of the second plurality of apertures, and are spatially distributed along the first longitudinal axis and the second longitudinal axis to form a barrier, then the plurality of barrier members are individually free to withdraw from the first rail and the second rail, without tools and while the first barrier panel remains installed as a barrier, by withdrawing a selected barrier member through the corresponding aperture in the first plurality of apertures until the selected barrier member is released from the corresponding aperture in the second plurality of apertures.

8. The safety barrier of claim 7, further comprising a longitudinally extending closure member configured to be releasably coupled to the first rail in a locked mode obstructing the first plurality of apertures, and further configured to be operated into an unlocked mode not obstructing the first plurality of apertures such that, when the closure member is operated into the locked mode, then the plurality of barrier members are releasably captured between the first rail and the second rail.

9. The safety barrier of claim 8, wherein the closure member is hingedly coupled to the first rail.

10. The safety barrier of claim 7, further comprising a coupling member having a first coupling aperture at a first end and a second coupling aperture at a second end configured such that:

when the coupling member is brought into register with the first barrier panel and at least one of the plurality of barrier members are operated through the corresponding aperture of the first plurality of apertures in the first rail, through the first coupling aperture of the coupling member, and into a corresponding aperture of the second plurality of apertures in the second rail, and a barrier member of a second barrier panel is operated through a third rail of the second barrier panel, through the second coupling aperture of the coupling member, and into a fourth rail of the second barrier panel, then the first barrier panel and the second barrier panel are releasably coupled together.

11. The safety barrier of claim 7, wherein at least one of: the first rail, and the second rail, comprises a hollow cross-section such that the rail defines at least one lumen extending from a distal end and from a proximal end of the rail.

12. The safety barrier of claim 11, wherein the rail is configured to receive a coupling member into the at least one lumen such that, when a coupling aperture through the coupling member is operated into register with at least one aperture of the first plurality of apertures and the second plurality of apertures, and at least one locking barrier member of the plurality of barrier members is operated through the first rail and into the second rail, including through the at least one aperture and through the coupling aperture, then the at least one locking barrier member releasably couples the first barrier panel to the coupling member.

13. The safety barrier of claim 12, wherein at least one of the frame members is fixedly coupled to the coupling member.

14. The safety barrier of claim 7, further comprising a third rail extending along a third longitudinal axis, the third rail comprising a third plurality of apertures spatially distributed along the third longitudinal axis, wherein the third rail is configured to be disposed between the first rail and the second rail with the plurality of barrier members disposed through corresponding apertures of the third plurality of apertures.

15. The safety barrier of claim 7, further comprising a gate panel having a plurality of coupling members extending from at least one side, the coupling members configured to couple to the first rail and the second rail, respectively, of the first barrier panel.

16. The safety barrier of claim 15, further comprising a gate hingedly and releasably coupled to the gate panel by a removable barrier member extending through at least two apertures in the gate panel and at least one aperture in the gate.

17. The safety barrier of claim 16, the gate comprising:

top rail having a third plurality of apertures extending through the entire top rail;

a lower rail having a fourth plurality of apertures extending into the lower rail; and, a plurality of gate barrier members individually releasably coupled to the gate when disposed through respective apertures of the third plurality of apertures and disposed in respective apertures of the fourth plurality of apertures.

18. The safety barrier of claim 7, further comprising an accessory having at least a first aperture such that, when a barrier member of the plurality of barrier members is passed through the first aperture and disposed in the first rail and the second rail, then the accessory is releasably coupled to the first barrier panel.

19. The safety barrier of claim 18, wherein the accessory comprises a hay rack.

20. The safety barrier of claim 7, further comprising a roughage feeder, the roughage feeder comprising:

an upper frame member having an array of apertures extending through the upper frame member;

a lower frame member having an array of apertures extending into the lower frame member;

a plurality of feeder barrier members configured to be individually and releasably coupled to the upper frame member and the lower frame member when each feeder barrier member is disposed through a corresponding aperture of the array of apertures in the upper frame member and into a corresponding aperture of the array of apertures in the lower frame member;

at least one substantially solid side panel;

a fenestrated panel coupled to the lower frame member; and a substantially solid cover hingedly coupled to the upper frame member, wherein:

the upper frame member and the lower frame member, the at least one substantially solid side panel, the fenestrated panel, and the cover cooperate to form a cavity configured to receive roughage, the cover is configured to be operated to selectively provide access into the cavity, the fenestrated panel allows particles smaller than a fenestration size to drop out of the cavity while preventing loss of roughage larger than the fenestration size, the plurality of feeder barrier members are spaced to allow a nose of a target animal to enter the cavity while preventing the target animal from protruding their entire head into the cavity and at least one of the upper frame member and the lower frame member is configured to releasably couple to the safety barrier by at least one of the plurality of barrier members being disposed through the at least one of the upper frame member and the lower frame member.

* * * * *